(12) United States Patent
Vaidya et al.

(10) Patent No.: US 7,373,991 B2
(45) Date of Patent: May 20, 2008

(54) SWELLABLE ELASTOMER-BASED APPARATUS, OILFIELD ELEMENTS COMPRISING SAME, AND METHODS OF USING SAME IN OILFIELD APPLICATIONS

(75) Inventors: Nitin Y. Vaidya, Missouri City, TX (US); Rashmi B. Bhavsar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 2 days.

(21) Appl. No.: 11/308,448

(22) Filed: Mar. 27, 2006

(65) Prior Publication Data

US 2007/0027245 A1 Feb. 1, 2007

Related U.S. Application Data

(60) Provisional application No. 60/700,107, filed on Jul. 18, 2005.

(51) Int. Cl.
*E21B 23/00* (2006.01)
*E21B 33/12* (2006.01)
(52) U.S. Cl. .................. 166/381; 166/387; 166/179; 166/65.1; 166/316; 166/205
(58) Field of Classification Search .................. None
See application file for complete search history.

(56) References Cited

U.S. PATENT DOCUMENTS

| | | | |
|---|---|---|---|
| 2,945,451 A | 7/1960 | Griswold | |
| 3,385,367 A | 5/1968 | Kollsman | |
| 3,581,816 A | 6/1971 | Malone | |
| 3,604,732 A | 9/1971 | Malone | |
| 4,349,204 A | 9/1982 | Malone | |
| 4,590,227 A | 5/1986 | Nakamura et al. | |
| 4,648,448 A | 3/1987 | Sanford et al. | |
| 4,713,465 A | 12/1987 | Kramer et al. | |
| 4,768,590 A | 9/1988 | Sanford et al. | |
| 4,832,120 A | 5/1989 | Coronado | |
| 4,862,967 A | 9/1989 | Harris | |

(Continued)

FOREIGN PATENT DOCUMENTS

EP 1479871 A1 11/2004

(Continued)

OTHER PUBLICATIONS

Leonid Akopyan, Investigation of Combining of Hydrogel Polymers with Rubber Mixtures, Final Report, 2005, pp. 1-87, PO No. RUS-1-1464-ST-04 dated Jun. 1, 2004, Institute of Rubber Coatings and Products, Russia.

(Continued)

*Primary Examiner*—Jennifer H. Gay
*Assistant Examiner*—Angela M Ditrani
(74) *Attorney, Agent, or Firm*—Jeffrey L. Wendt; Kevin B. McGoff; Bryan P. Galloway

(57) ABSTRACT

Oilfield apparatus and methods of use, the apparatus comprising an elastomeric composition comprising the reaction product of a linear or branched polymer having residual ethylenic unsaturation with an ethylenically unsaturated organic monomer having at least one reactive moiety selected from the group consisting of acid, acid anhydride, and acid salt.

22 Claims, 12 Drawing Sheets

U.S. PATENT DOCUMENTS

| | | | |
|---|---|---|---|
| 4,951,747 A | 8/1990 | Coronado | |
| 5,143,154 A | 9/1992 | Mody et al. | |
| 5,197,542 A | 3/1993 | Coone | |
| 5,205,567 A | 4/1993 | Quinlan et al. | |
| 5,271,469 A | 12/1993 | Brooks et al. | |
| 5,290,844 A * | 3/1994 | Otsuka | 524/426 |
| 5,721,200 A | 2/1998 | Shirodkar et al. | |
| 5,824,718 A | 10/1998 | Penfold et al. | |
| 6,441,143 B1 | 8/2002 | Koski | |
| 6,500,540 B1 | 12/2002 | Langohr et al. | |
| 6,634,431 B2 | 10/2003 | Cook et al. | |
| 6,640,893 B1 | 11/2003 | Rummel et al. | |
| 6,719,064 B2 | 4/2004 | Price-Smith et al. | |
| 6,722,437 B2 | 4/2004 | Vercaemer et al. | |
| 6,752,205 B2 | 6/2004 | Kutac et al. | |
| 6,820,690 B2 | 11/2004 | Vercaemer et al. | |
| 6,834,725 B2 | 12/2004 | Whanger et al. | |
| 6,848,505 B2 | 2/2005 | Richard et al. | |
| 6,854,522 B2 | 2/2005 | Brezinski et al. | |
| 6,998,382 B2 | 2/2006 | Yang et al. | |
| 2001/0016629 A1 | 8/2001 | Mori et al. | |
| 2002/0010248 A1 | 1/2002 | Fomperie et al. | |
| 2002/0177650 A1 | 11/2002 | Mori et al. | |
| 2003/0036599 A1 | 2/2003 | Mori et al. | |
| 2003/0098153 A1 | 5/2003 | Serafin | |
| 2003/0146003 A1 | 8/2003 | Duggan et al. | |
| 2004/0118572 A1 | 6/2004 | Whanger et al. | |
| 2004/0123983 A1 | 7/2004 | Cook et al. | |
| 2005/0072576 A1 | 4/2005 | Henriksen et al. | |
| 2005/0072579 A1 | 4/2005 | Gambier | |
| 2005/0109502 A1 | 5/2005 | Slay et al. | |
| 2005/0161212 A1 | 7/2005 | Leismer et al. | |
| 2005/0161232 A1 | 7/2005 | Patel et al. | |

FOREIGN PATENT DOCUMENTS

| | | |
|---|---|---|
| EP | 1533469 A1 | 5/2005 |
| GB | 247593 | 1/1927 |
| GB | 2404397 A | 2/2005 |
| GB | 2406593 A | 4/2005 |
| WO | 02020941 A1 | 3/2002 |
| WO | 02059452 A1 | 8/2002 |
| WO | 03008756 A1 | 1/2003 |
| WO | 03056125 A2 | 7/2003 |
| WO | 2004005665 A2 | 1/2004 |
| WO | 2004005669 A1 | 1/2004 |
| WO | 2004018836 A1 | 3/2004 |
| WO | 2004022911 A2 | 3/2004 |
| WO | 2004027209 A1 | 4/2004 |
| WO | 2004057715 A2 | 7/2004 |
| WO | 2004101952 A1 | 11/2004 |
| WO | 2005012686 A1 | 2/2005 |
| WO | 2005052308 A1 | 6/2005 |

OTHER PUBLICATIONS

Mamoud A. Al-Anazi, Mukul M. Sharma, Evaluation of a pH-Sensitive Polymer for Gravel-Packing Operations, SPE Drilling & Completion, Mar. 2002, pp. 28-36, Society of Petroleum Engineers, U.S.

H.A. Al-Anazi, M.M. Sharma, Evaluation of a pH-Sensitive Polymer for Gravel-Packing Operations, SPE 67292, 2002, pp. 1-10, Society of Petroleum Engineers, U.S.

Hamoud A. Al-Anazi, Mukul M. Sharma, Use of a pH Sensitive Polymer for Conformance Control, SPE 73782, 2002, pp. 1-8, Society of Petroleum Engineers, U.S.

Dr R P Campion, Dr B Thomson, Dr J A Harris, Elastomers for fluid containment in offshore oil and gas production: Guidelines and review, Research Report 320, 2005, Part 1—pp. i-viii, 1-34; Part 2—pp. i-ii, 1-63, MERL Ltd., U.K.

EASYWELL, Swellpacker for Oil-Based Mud, Achieve complete zonal isolation of producing zones, 2005, web article, 2 pages, Easy Well Solutions a.s., Norway.

EASYWELL, Swellpacker for Water-Based Mud, Achieve complete zonal isolation of producing zones, 2005, web article, 2 pages, Easy Well Solutions a.s., Norway.

EASYWELL, Swellpacker for High Pressure, Achieve complete zonal isolation of producing zones, 2005, web article, 2 pages, Easy Well Solutions a.s., Norway.

EASYWELL, Swellpacker for High Temperature, Achieve complete zonal isolation of producing zones, 2005, web article, 2 pages, Easy Well Solutions a.s., Norway.

Zhiyuan Xie, Min Li, Xinfang Chen, Huizhen Hu, Shuhua Li, Studies on Water-Swellable Elastomer. I. Synthesis and Characterization of Amphiphilic Polymer, Journal of Applied Polymer Science, 1996, pp. 495-499, vol. 61, John Wiley & Sons, Inc., U.S.

Yuhong Zhang, Peixin He, Qichao Zou, Benqiao He, Preparation and Properties of Water-Swellable Elastomer, Journal of Applied Polymer Science, 2004, pp. 1719-1723, vol. 93, Wiley Periodicals, Inc., U.S.

Jing-Wei Shen, X Iao-Mei Chen, Wen-Yi Huang, Structure and Electrical Properties of Grafted Polypropylene/Graphite Nanocomposites Prepared by Solution Intercalation, Journal of Applied Polymer Science, 2003, pp. 1864-1869, vol. 88, Wiley Periodicals, Inc.

Wenge Zheng, Shing-Chung Wong, Hung-Jue Sue, Transport behavior of PMMA/expanded graphite nanocomposites, Polymer 73, 2002, pp. 6767-6773, Elsevier Science Ltd.

Charles Wilkie, Nanocomposite Technology, Back to Chemistry Department Website, 2001, Marquette University, U.S.

T.G. Gopakumar, D.J.Y.S. Page, Polypropylene/Graphite Nanocomposites by Thermo-Kinetic Mixing, Polymer Engineering and Science, Jun. 2004, pp. 1162-1169, vol. 44, No. 6, Wiley InterScience, Canada.

Guo-Hua Chen, Da-Jun Wu, Wen-Gui Weng, Wen-Li Yan, Dispersion of Graphite Nanosheets in a Polymer Matrix and the Conducting Property of the Nanocomposites, Polymer Engineering and Science, Dec. 2001, pp. 2148-2154, vol. 41, No. 12.

X.S. Du, M. Xiao, Y.Z. Meng, A.S. Hay, Facile synthesis of exfoliated and highly conductive poly(arylene disulfide)/graphite nanocomposites, Polymers for Advanced Technologies, 2004, pp. 320-323, vol. 15, John Wiley & Sons, Ltd.

X.S. Du, M. Xiao, Y.Z. Meng, Synthesis and Characterization of Polyaniline/Graphite Conducting Nanocomposites, Journal of Polymer Science: Part B: Polymer Physics, 2004, pp. 1972-1878, vol. 42, Wiley Periodicals, Inc.

Wengui Weng, Guohua Chen, Dajun Wu, Xiangfeng Chen, Jinrong Lu, Pingping Wang, Fabrication and Characterization of Nylon 6/Foliated Graphite Electrically Conducting Nanocomposite, Journal of Polymer Science: Part B: Polymer Physics, 2004, pp. 2844-2856, vol. 42, Wiley Periodicals, Inc.

Yu-Xun Pan, Zhong-Zhen Yu, Yu-Chun Ou, Guo-Hua Hu, A New Process of Fabricating Electrically Conducting Nylon 6/Graphite Nanocomposites via Intercalation Polymerization, Journal of Polymer Science: Part B: Polymer Physics, 2000, pp. 1626-1633, vol. 38, John Wiley & Sons, Inc.

Rui Zhang, Yuan Hu, Jiayan Xu, Weicheng Fan, Zuyao Chen, Qinan Wang, Preparation and Combustion Properties of Flame Retardant Styrene-Butyl Acrylate Copolymer/Graphite Oxide Nanocomposites, Macromolecular Materials and Engineering, 2004, pp. 355-359, vol. 289, Wiley-VCH Verlag GmbH & Co. KGaA, Weinheim, Germany.

Guohua Chen, Wengui Weng, Dajun Wu, Cuiling Wu, Nonlinear Conduction in Nylon-6/Foliated Graphite Nanocomposites above the Percolation Threshold, Journal of Polymer Science: Part B: Polymer Physics, 2004, pp. 155-167, vol. 42, Wiley Periodicals, Inc.

Guo-Hua Chen, Da-Jun Wu, Wen-Gui Weng, Wen-Li Yan, Preparation of Polymer/Graphite Conducting Nanocomposite by Intercalation Polymerization, Journal of Applied Polymer Science, 2001, pp. 2506-2513, vol. 82, John Wiley & Sons, Inc.

Wenge-Zheng, Xuehong Lu, Shing-Chung Wong, Electrical and Mechanical Properties of Expanded Graphite-Reinforced High-Density Polyethylene, Journal of Applied Polymer Science, 2004, pp. 2781-2788, vol. 91, Wiley Periodicals, Inc.

Y. Kojima, K. Fukumori, A. Usuki, A Okada, T Kurauchi, Gas permeabilities in rubber-clay hybrid, Journal of Materials Science Letters 12, 1993, pp. 889-890, Chapman & Hall.

Yoshitsugu Kojima, Arimitsu Usuki, Masaya Kawasumi, Akane Okada, Yoshiaki Fukushima, Toshio Kurauchi, Osami Kamigaito, Mechanical properties of nylon 6-clay hybrid, Journal of Materials Research, 1996, p. 1185; vol. 8, No. 5, Materials Research Society.

Tie Lan, Padmananda D. Kaviratna, Thomas J. Pinnavaia, On the Nature of Polyimide-Clay Hybrid Composites, Chem. Mater. 1994, pp. 573-575, vol. 6, American Chemical Society.

K.E. Strawhecker, E Manias, Structure and Properties of Poly(vinyl alcohol)/Na+Montmorillonite Nanocomposites, Chem. Mater. 2000, pp. 2943-2949, vol. 12, American Chemical Society, U.S.

Ruijian Xu, Evangelos Manias, Alan J. Snyder, James Runt, New Biomedical Poly(urethane urea)-Layered Silicate Nanocomposites, Macromolecules 2001, pp. 337-339, vol. 34, American Chemical Society, U.S.

* cited by examiner

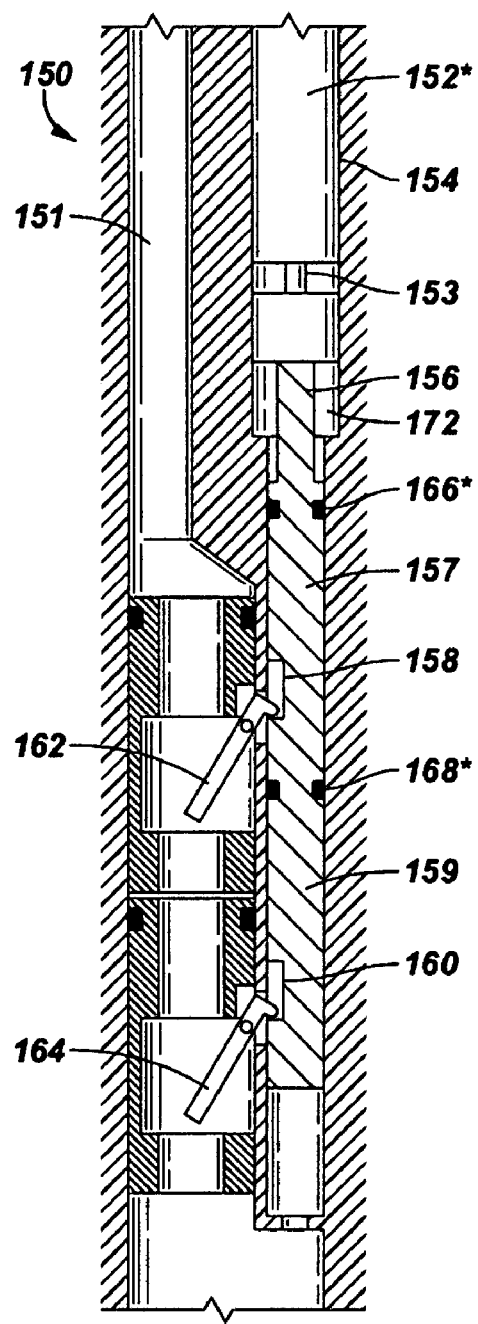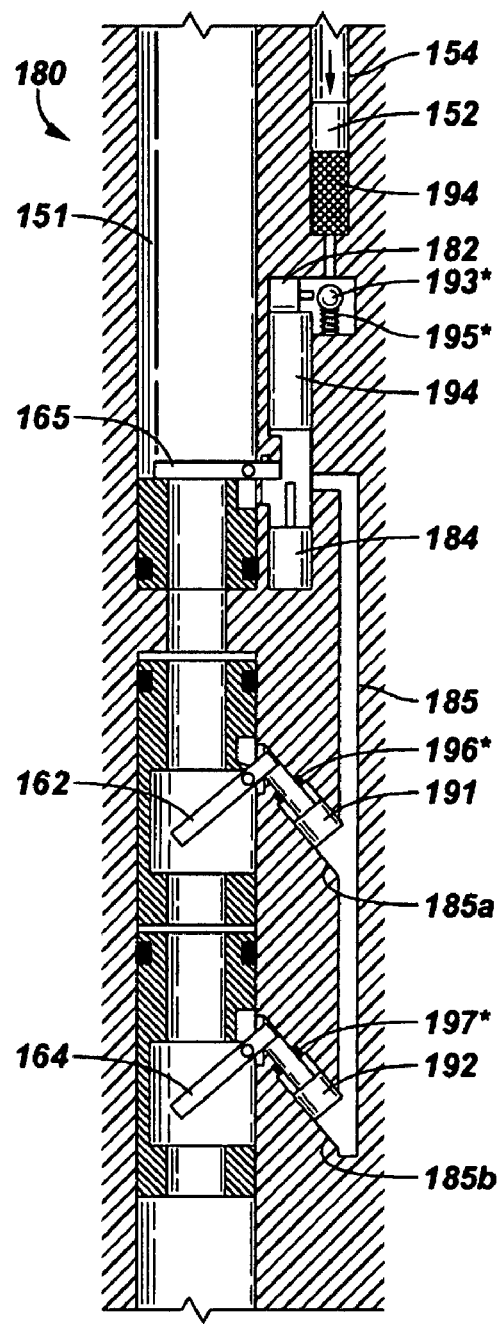

SWELLABLE ELASTOMER-BASED APPARATUS, OILFIELD ELEMENTS COMPRISING SAME, AND METHODS OF USING SAME IN OILFIELD APPLICATIONS

CROSS REFERENCE TO RELATED APPLICATIONS

The present application claims priority under 35 U.S.C. § 119(e) to U.S. Provisional Application Ser. No. 60/700,107, filed Jul. 18, 2005, incorporated by reference herein in its entirety.

BACKGROUND OF THE INVENTION

1. Field of Invention

The present invention relates generally to the field of oilfield exploration, production, and testing, and more specifically to swellable elastomeric materials and their uses in such ventures.

2. Related Art

Recently there has been a growing interest in swellable elastomers for use in oilfield applications. Oil-swellable packers are now on the market, as well as expandable zonal isolation profilers that use a water-swellable elastomer. There are reported to be water-swellable and oil-swellable packers on the market for oilfield applications, although it is not known if these packers swell in both oil and water.

Most commercially available elastomers exhibit a high resistance to swelling in water and brines, but are not too resistant to swelling in oils. Resistance to water and brine swelling is required for common non-oilfield applications like tires, hose, wire and cable applications, and the like. Many commonly used elastomers exhibit poor resistance to swelling in oil. Other elastomers such as nitrile, hydrogenated nitrile, fluoroelastomers and acrylate-based elastomers are designed to resist swelling in oil and are extensively used in oilfield applications; and are resistant to swelling in water and brine.

In order to make oil-swellable elastomers also swell in water, previous publications have disclosed blends of elastomers with superabsorbent polymers like hydrogels (Report #RUS 1-1464-ST-04, Institute of Rubber Coatings and Products, L. Akopyan, Moscow Research Center, and references therein). The main drawback of blending in hydrogels is that hydrogel-containing swellable polymers do not possess long term physical integrity. This is because the hydrogel particles that are initially embedded in the elastomer tend to migrate to the surface of the elastomer part and into the water phase. As a result the elastomer-hydrogel blend exhibits nonuniform swelling and develops blisters on the surface when exposed to water. After a few days of exposure to water these blisters burst open and hydrogel particles are ejected out of the blend leaving behind cracks in the elastomer. The hydrogel-filled elastomer swells when exposed to water but the hydrogel particles migrate to the surface of the elastomer causing the elastomer to develop blisters, fissures and eventual disintegration of the material. This makes hydrogel/elastomer blends unsuitable for long term application in oilfields.

Many oilfield elements and tools utilize elastomeric materials. For example, elastomers and other polymers may be used in packer elements, blow out preventer elements, submersible pump protectors (sometimes referred to as protector bags), O-rings, gaskets, electrical insulators, pressure sealing elements for fluids, and in many other oilfield elements.

Common to all of these uses of elastomers is exposure to hostile environments, such as hostile chemical and mechanical subterranean environments, that tend to unacceptably decrease the life and reliability of the elastomers. There remains a need in the natural resources exploration, production, and testing field for improving reliability and life, as well as electrical properties in some instances, of elastomeric components used in oilfield environments, such as protector bags, packer elements, pressure seals, valves, blow out preventer components, cable shielding and jacketing, and the like. It would be an advance in the art to develop elastomer compositions (and methods of making same) that swell but do not substantially degrade or disintegrate upon long term exposure to water and water-based fluids, such as brines, and optionally in hydrocarbon fluids.

SUMMARY OF THE INVENTION

In accordance with the present invention, apparatus, oilfield elements comprising the apparatus, and methods of using the ojlfield elements are described that reduce or overcome problems in previously known apparatus, oilfield elements, and methods. By combining the properties of linear or branched chain polymers having residual unsaturation with the properties of water soluble monomers and other additives, inventive elastomeric compositions may be prepared and used in inventive apparatus and oilfield elements. The resulting elastomeric compositions may be described as non-porous, or porous and swelled, acid-grafted rubbers, which may or may not be vulcanized. The terms "vulcanized" and "crosslinked" are used interchangeably herein, although vulcanization technically refers to a physicochemical change resulting from crosslinking of the unsaturated hydrocarbon chain of polyisoprene with sulfur or peroxide, usually with the application of heat. The relatively hydrophobic linear or branched chain polymers and relatively hydrophilic water-soluble monomers, either grafted onto the polymer backbone or blended therein, may act together to cost-effectively increase the water- and/or oil-swellability of oilfield elements that comprise one or more apparatus of the invention. In particular, the use of unsaturated organic acids, anhydrides, and their salts (for example maleic acid, maleic anhydride, and their salts), offer a commercially feasible way to develop inexpensive composite materials with good water- and brine-swellability, and optionally hydrocarbon fluid swellability, depending on the type of inorganic additives and monomers used.

A first aspect of the invention is an apparatus comprising an elastomeric composition comprising the reaction product of a linear or branched polymer having residual ethylenic unsaturation with an ethylenically unsaturated organic monomer having at least one reactive moiety selected from acid, acid anhydride, and acid salt, or allyl alcohol, the elastomeric composition formed into an oilfield element.

As used herein the term "elastomeric composition" includes any composition having desired elastomeric and swelling properties for the intended purpose of the oilfield element in question. For example, in some embodiments an elastomeric composition may comprise substantially all elastomer, while in other formulations the elastomer may be accompanied by one or more other polymeric or non-polymeric compositions, such as thermoplastic and thermoset polymers, plasticizers, fillers, shape stabilizers, and the like. As used herein the term "reaction product" means that some or all of the ethylenically unsaturated positions of the polymer, whether pendant, in-chain, or both, are addition polymerized with the ethylenically unsaturated portion of an organic monomer having the mentioned acid, anhydride, or acid salt moiety.

The linear or branched polymer having residual ethylenic unsaturation functions as the main structural component of the elastomer, and, depending on its length, solubility parameter, and other factors, largely determines the oil-swellability of the composition and therefore the oil-swellability of the oilfield element. A non-limiting example is terpolymers of ethylene-propylene-diene monomer (EPDM), wherein the diene monomer may be selected from a number of non-conjugated dienes.

The ethylenically unsaturated organic monomer having at least one reactive moiety selected from acid, acid anhydride, and acid salt functions mainly as a means to attach (graft) and/or blend in hydrophilic cites and lend water-swellability to the elastomer. A secondary function is to provide crosslinking cites, if the monomer comprises more than one ethylenically unsaturated moiety. Maleic acid is a non-limiting example of this component.

The elastomeric composition may comprise any number of additives, fillers, and the like, depending on the end use of the oilfield element. One such additive is an inorganic swelling agent, which functions to enhance the water-swellability of the elastomeric compositions useful in the invention. Inorganic swelling agents useful for this purpose include alkali- and alkaline earth carbonates, such as, but not limited to, carbonates of sodium (sodium carbonate; soda ash). Sodium carbonate may also act as a foaming agent and enhance the permeation and rate of swelling.

Apparatus in accordance with the invention include those wherein the elastomeric composition is vulcanized by an organic vulcanizing agent. Examples of organic vulcanization elements useful in the invention may be selected from organic peroxides, such as, but not limited to, dicumyl peroxide.

By varying the linear or branched polymer having residual ethylenic unsaturation (sometimes referred to herein as the base elastomer), the degree of swelling in hydrocarbon oil may be varied. As a result, if base elastomers like nitrile or HNBR, or other oil-swell resistant polymers are employed, with maleic acid alone or maleic acid/sodium carbonate mixture, then the elastomer becomes water-swellable but exhibits very low swell in hydrocarbon oils. The base elastomer may vary from 1 to 100 percent of an oil-swell resistant polymer.

The ethylenically unsaturated organic monomer having at least one reactive moiety selected from acid, acid anhydride, and acid salt may comprise a low cost, highly acidic unsaturated monomer, or such a monomer may be added to the polymerized elastomer. Such a monomer copolymerized with or simply added to EPDM, nitrile, or HNBR results in an elastomer that swells low pH fluids such as completion fluids comprising zinc bromide. An example is 2-acrylamido-2-methylpropane sulfonic acid (AMPS), but the invention is not so limited.

The base elastomer may include a zwitterionic polymer blended into the base elastomer, or a copolymer of zwitterionic monomers and unsaturated monomers like butadiene and isoprene, allowing production of a crosslinkable elastomer that swells in high salinity brines as well as in hydrocarbon oil-based fluids. A diene monomer may be included for crosslinking cites. Representative zwitterionic polymers useful in the invention include, but are not limited to, copolymers of 2-methacryloyloxyethyl-2'-trimethylammonium ethyl phosphate inner salt (MPC) with comonomers, including a variety of hydrophobic monomers, for instance $C_{4-18}$-alkyl methacrylate, and fluoroalkyl methacrylates.

A second aspect of the invention is an apparatus comprising a high temperature swellable elastomeric composition comprising a physical mixture or blend of a linear or branched polymer having residual ethylenic unsaturation with a low cost, highly acidic unsaturated monomer, the elastomeric composition formed into an oilfield element. A first portion of the low cost, highly acidic unsaturated monomer may be grafted onto the linear or branched polymer having residual ethylenic unsaturation, while a second portion may remain in physical mixture with the elastomer. These compositions function as a high temperature resistant swellable elastomer. The use of AMPS monomer has an advantage in that it is routinely used in the oilfield industry in loss circulation fluids and is very resistant to down hole chemicals and environments.

A third aspect of the invention is an apparatus comprising a high temperature swellable elastomeric composition comprising a physical blend of a linear or branched polymer having residual ethylenic unsaturation and ethylenically unsaturated organic monomer having at least one reactive moiety selected from acid, acid anhydride, and acid salt, the elastomeric composition formed into an oilfield element. Elastomeric blends of EPDM and an unsaturated organic acid, for example maleic acid, exhibit some degree of self-healing capability when exposed to water at 100C for 24 hrs. Tests with EPDM/maleic acid blends have shown that a cut introduced in the elastomer specimen healed due to swelling and flow of the elastomer at elevated temperature. The healing of elastomer may not give a bond with high strength since the bonding is not due to chemical crosslinking, however it may have sufficient strength to create a seal. One example of potential oilfield element application of these materials is for sealing the communication line in well bore when it passes through a packer.

The elastomer composition may be selected from any elastomer listed in ASTM D1418, and may comprise one or more non-elastomeric polymers selected from natural and synthetic polymers, including those listed in ASTM D1600-92, "Standard Terminology for Abbreviated Terms Relating to Plastics". The elastomer and non-elastomer may be layered, wherein individual layers may be the same or different in composition and thickness, interpenetrating networks, and the like. The elastomer composition may include fillers, plasticizers, accelerants, fibers, nanoflakes and/or nanoplatelets. Non-elastomeric polymers may include, but are not limited to, thermoplastic polymers, such as polyolefins, polyamides, polyesters, thermoplastic polyurethanes and polyurea urethanes, copolymers, and blends thereof, and the like; one or more thermoset polymers, such as phenolic resins, epoxy resins, and the like.

Apparatus within the invention include those wherein the oilfield element may be any element exposed to water, brine, low and high pH fluids, and/or hydrocarbon fluids, such as, but not limited to packer elements (the elastomeric components), submersible pump motor protector bags, sensor protectors, blow out preventer elements, O-rings, T-rings, gaskets, pump shaft seals, tube seals, valve seals, seals and insulators used in electrical components, such as wire and cable semiconducting shielding and/or jacketing, power cable coverings, seals and bulkheads such as those used in fiber optic connections and other tools, and pressure sealing elements for fluids (gas, liquid, or combinations thereof).

Another aspect of the invention are oilfield assemblies for exploring for, testing for, or producing hydrocarbons, one oilfield assembly comprising:

(a) one or more oilfield elements; and (b) one or more of the oilfield elements comprising an apparatus comprising an elastomeric composition as described in one of the first, second and third aspects of the invention.

Yet another aspect of the invention are methods of exploring for, drilling for, or producing hydrocarbons, one method comprising:

(a) selecting one or more oilfield elements having a component comprising an elastomeric composition as described in one of the first, second and third aspects of the invention; and (b) using the oilfield element in an oilfield operation, thus exposing the oilfield element to an oilfield environment.

Methods of the invention may include, but are not limited to, running one or more oilfield elements into a wellbore using one or more surface oilfield elements, and/or retrieving the oilfield element from the wellbore. The oilfield environment during running and retrieving may be the same or different from the oilfield environment during use in the wellbore or at the surface.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 8A and 8B are schematic cross-sectional views of two reversing tools utilizing elastomeric composition components in accordance with the invention;

Figure 1:
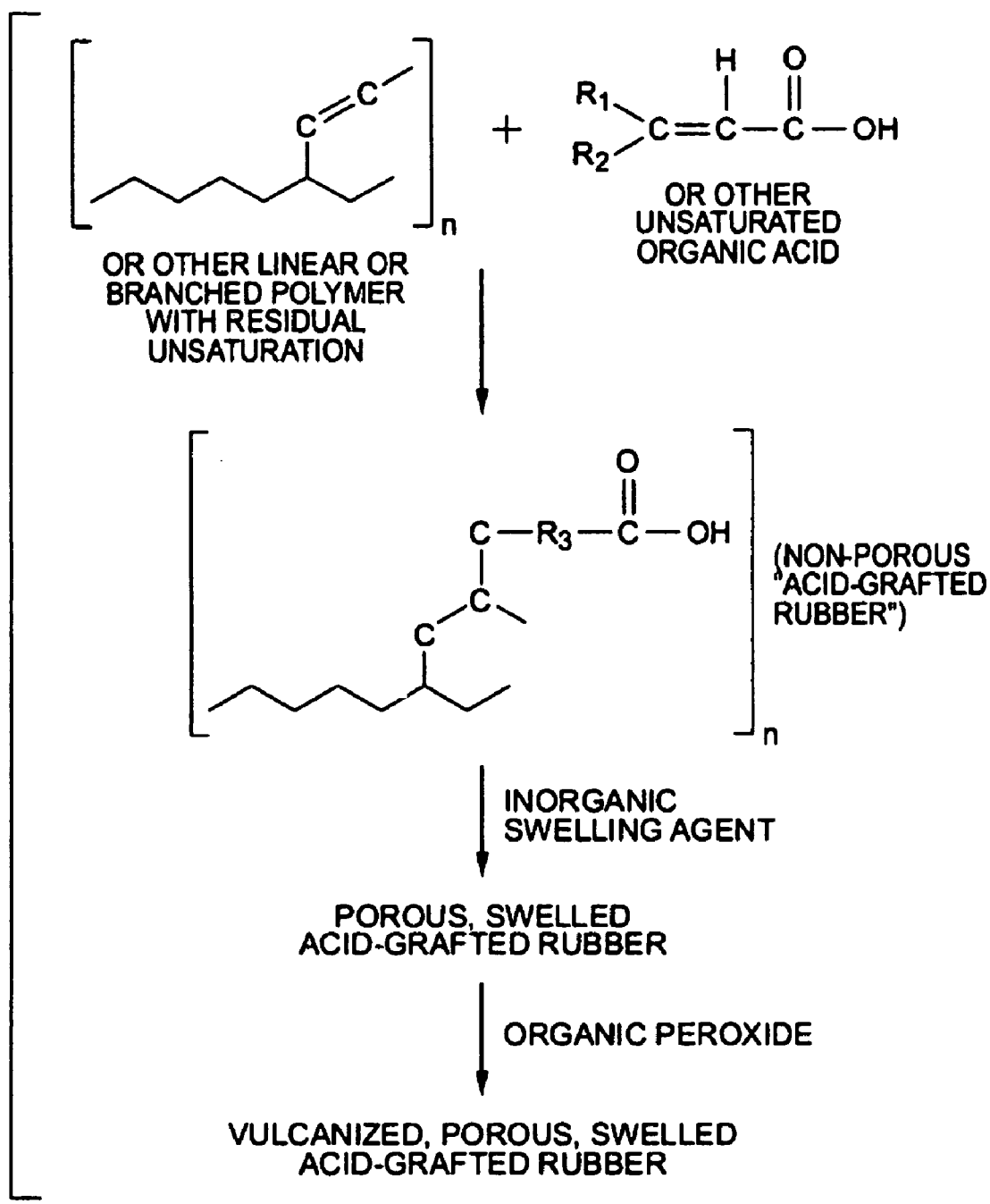
FIGS. 1-4 illustrate in flow-sheet fashion how to make some embodiments of elastomeric compositions useful in apparatus of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes apparatus comprising an elastomeric material useful in oilfield applications, including hydrocarbon exploration, drilling, testing, completion, and production activities. As used herein the term "oilfield" includes land based (surface and sub-surface) and sub-seabed applications, and in certain instances seawater applications, such as when hydrocarbon exploration, drilling, testing or production equipment is deployed through seawater. The term "oilfield" as used herein includes hydrocarbon oil and gas reservoirs, and formations or portions of formations where hydrocarbon oil and gas are expected but may ultimately only contain water, brine, or some other composition. A typical use of the apparatus comprising an elastomeric component will be in downhole applications, such as zonal isolation of wellbores, although the invention is not so limited. A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

Recently there has been a growing interest in swellable elastomers for use in oilfield applications. In order to make elastomers swell in water, previous publications have disclosed elastomer formulations that contain superabsorbent polymers like hydrogels (Report #RUS 1-1464-ST-04, Institute of Rubber coatings and products, L. Akopyan, Moscow Research center and references therein). The main drawback of using hydrogels is that hydrogel containing swellable polymers do not possess long term physical integrity. This is because the hydrogel particles embedded in the elastomer tends to migrate to the surface of the elastomer part and into the water phase. As a result, elastomer/hydrogel blends show a nonuniform swelling and develop blisters on the surface when exposed to water. After a few days of exposure to water these blisters burst open and hydrogel particles are ejected out of the blend leaving behind cracks in the elastomer.

Elastomeric compositions and methods of making same described herein provide a concept of making low-cost commercial elastomers containing some double bonds swellable in water. "Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multi-polymers. Examples include ethylene-propylene-diene polymer (EPDM), various nitrile rubbers which are copolymers of butadiene and acrylonitrile such as Buna-N (also known as standard nitrile and NBR). By varying the acrylonitrile content, elastomers with improved oil/fuel swell or with improved low-temperature performance can be achieved. Specialty versions of carboxylated high-acrylonitrile butadiene copolymers (XNBR) provide improved abrasion resistance, and hydrogenated versions of these copolymers (HNBR) provide improve chemical and ozone resistance elastomers. Carboxylated HNBR is also known. As used herein the phrases "swellable in water", "water-swellable", "water swellability" and the like are used interchangeably and mean that the elastomeric composition swells at least up to 25 percent, in some embodiments up to 100 percent, and in some embodiments up to 200 percent of their original volume after soaking in tap water at 100C for 24 hours. Similarly, the phrases "swellable in oil", "oil-swellable", "oil swellability" and the like are used interchangeably and mean that the elastomeric composition swells at least up to 25 percent, in some embodiments up to 100 percent, and in some embodiments up to 300 percent of their original volume after soaking in kerosene at 100C for 24 hours. Unsaturated organic acids are employed as grafting agents, and in some embodiments both as grafting agents and additives, along with other ingredients, to make commercial elastomers variably water-swellable, oil- and water-swellable, swellable in low pH and high-salinity brines, and/or high-temperature swellable by using commercially available materials, making the elastomeric compositions exemplary for use in a variety of oilfield applications. In certain embodiments the elastomer formulations may exhibit self-healing properties, making their use in self-healing, swellable seals possible.

Elastomeric compositions useful in the invention include those that are: 1) low-cost and water-swellable; 2) low-cost and water- and oil-swellable; 3) swellable in high-salinity brines like completion fluids; 4) high-temperature stable; and 5) low-cost and swellable in very low pH solutions. Elastomeric compositions disclosed herein may be used for sealing applications in oilfield industry especially for applications such as swellable packers, flow control, sand control, and coil tubing slack management. These materials may also be used as self-healing seals for downhole applications. One major advantage of elastomeric compositions disclosed herein is that all the elastomers and additives mentioned in this disclosure except the high-salinity swellable elastomers and the high-temperature swellable elastomers are, at least presently, relatively low cost, commercially available materials. The elastomeric compositions useful in oilfield elements of the invention may be readily made in small or large quantities by using standard elastomer manufacturing techniques such as Banbury and two roll mill compounding.

FIGS. 1-4 illustrate in flow-sheet fashion how to make some embodiments of elastomeric compositions useful in apparatus of the invention. Depicted schematically in FIG. 1 is a method of making a commercial elastomer, for example EPDM, natural rubber, polybutadiene, polyisoprene, ethylene-octene based rubber and other linear or branched ethylene olefin-based elastomers having residual unsaturation swellable in water. One process involves grafting an unsaturated organic acid molecule. A common example of an unsaturated organic acid used for this purpose is maleic acid. Other molecules that can be used include mono- and di-sodium salts of maleic acid and potassium salts of maleic acid. Although in principle other unsaturated carboxylic acids may also be grafted onto commercial unsaturated elastomers, acids that exist in solid form may not require additional steps or manipulation, as will be readily apparent to those having reasonable skill in the chemical art. Mixing other unsaturated acids such as acrylic acid and methacrylic acid is also possible but may be more difficult since they are liquids at room temperature. Unsaturated acids such as palmitoleic acid, oleic acid, linoleic acid, and linolenic acid may also be used. The initial reaction leads to a relatively non-porous "acid-grafted rubber", as shown in FIG. 1. In order to enhance the swelling of elastomers, addition of a small amount of alkali such as soda ash, along with or separate from the unsaturated acid, leads to formation of a porous, swellable acid grafted rubber. Micro-porosities are formed in the composition, allowing the water to rapidly reach the interior region of a molded part and increase the rate and extent of swelling. Although the rate of swelling may be hours in some embodiments, in certain embodiments the rate of swelling may be measured in minutes. The rate of swelling is defined as the amount of time required for the swelled composition to reach an equilibrium state, where swelling has ceased. FIG. 1 also depicts that an organic peroxide vulcanizing agent may be employed to produce a vulcanized, porous, swellable acid-grafted rubber formulation. In one embodiment, 100 phr of EPDM, 5-100 phr of maleic acid, 5-50 phr of sodium carbonate, and 1-10 phr of dicumyl peroxide as vulcanizing agent showed at least 150 percent swelling of elastomer when exposed to both water at 100C for 24 hrs and at room temperature for 24 hrs in kerosene. Other commercially available grades of organic peroxides, as well as other vulcanization agents, are presented herein.

Figure 2:
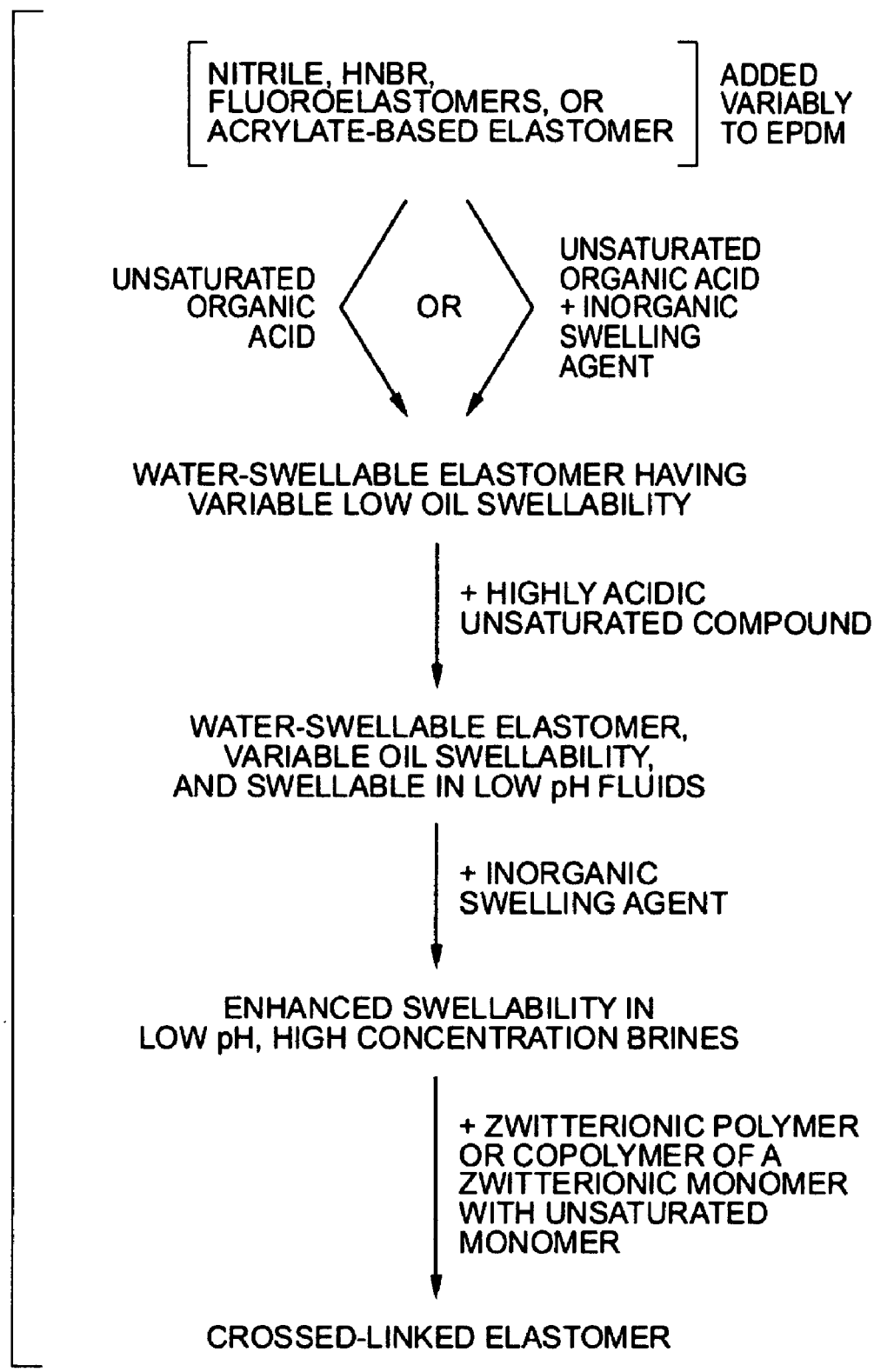

Referring now to FIG. 2, there is illustrated another scheme for making swellable elastomers useful in the invention. FIG. 2 illustrates that elastomers such as nitrile, HNBR, fluoroelastomers, or acrylate-based elastomers, or their precursors, if added in variable amounts to an EPDM polymer or its precursor monomer mixture, along with a sufficient amount (from about 1 to 10 phr) of an unsaturated organic acid, anhydride, or salt thereof, such as maleic acid, optionally combined with a sufficient amount (from 1 about to 10 phr) an inorganic swelling agent such as sodium carbonate, may produce a water-swellable elastomer having variable low-oil swellability. Addition to the monomer mixture, or to the elastomer after polymerization, of a sufficient amount (from about 0.5 to 5 phr) of a highly acidic unsaturated compound such as 2-acrylamido-2-methylpropane sulfonic acid (AMPS), results in a water-swellable elastomer having variable oil-swellability, and which is further swellable in low pH fluids such as completion fluids containing zinc bromide. A second addition of a sufficient amount (from 1 to 10 phr more than the original addition) of inorganic swelling agent enhances swellability in low pH, high concentration brines. Finally, the addition of a sufficient amount (from 1 to 20 phr) of zwitterionic polymer or copolymer of a zwitterionic monomer with an unsaturated monomer, results in a cross-linked elastomer. The amounts of the various ingredients at each stage may be varied as suited for the particular purpose at hand. For example, if one simply wishes to produce a highly cross-linked, moderately water-swellable (about 100 percent swell) elastomer having very low oil-swellability but very high swellability in low pH fluids, one would use a recipe of 60 to 80 phr of EPDM, and 20 to 40 phr of nitrile or HNBR, and 4 to 5 phr of AMPS, as well as about 15 to 20 phr of a zwitterionic polymer or monomer and 1 to 10 phr of crosslinking agent such as triallyl isocyanurate.

Figure 3:
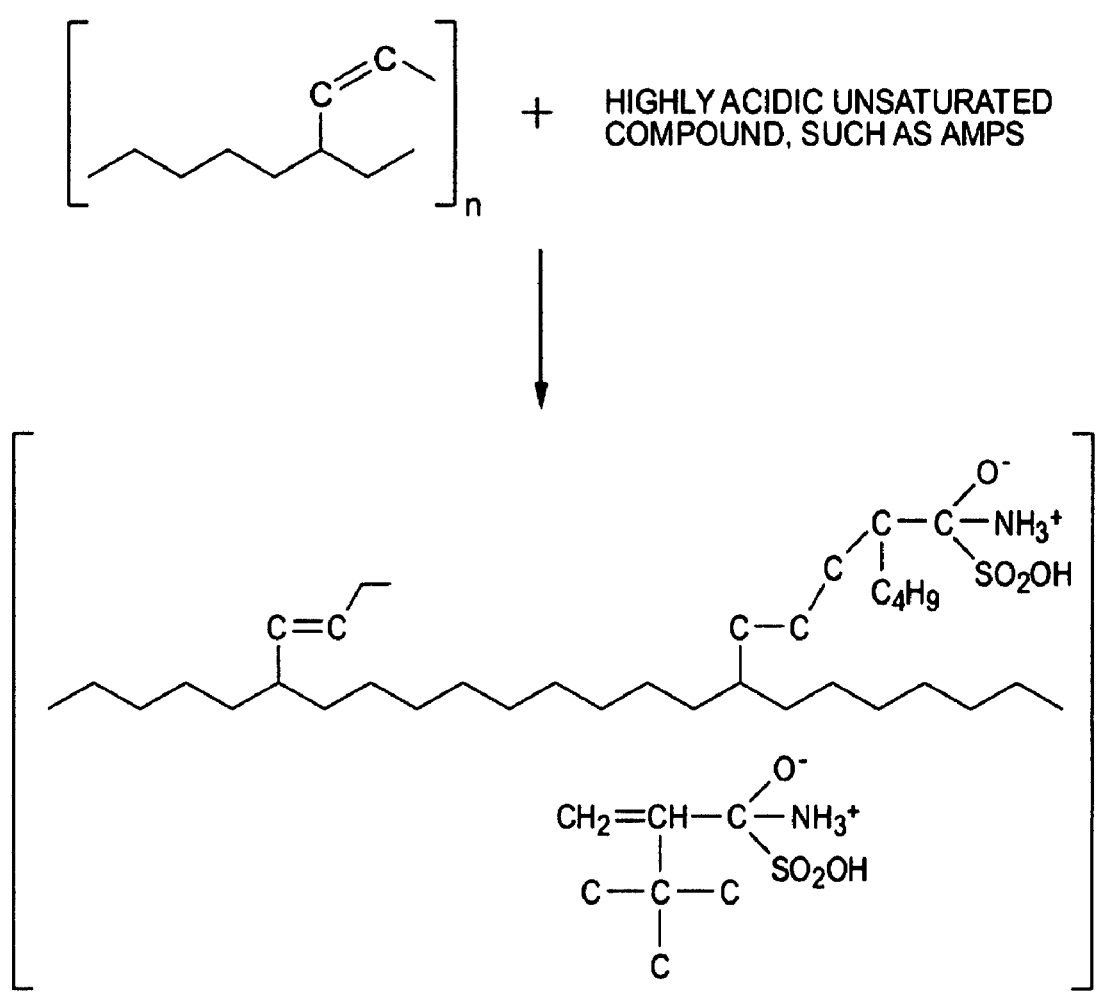

FIG. 3 illustrates yet another reaction scheme within the invention, enabling a low-cost procedure for making high-temperature swellable elastomers involving the use of AMPS monomer and like sulfonic acid monomers. Since AMPS monomer is chemically stable up to at least 350F (177C), mixtures of EPDM and AMPS monomer which may or may not be grafted on to EPDM (as illustrated in FIG. 3) will function as a high-temperature resistant water-swellable elastomer. The use of AMPS and like monomers maybe used in like fashion to functionalize any commercial elastomer to make a high-temperature water-swellable elastomer. An advantage of using AMPS is that it is routinely used in oilfield industry in loss circulation fluids and is very resistant to down hole chemicals and environments.

Figure 4:
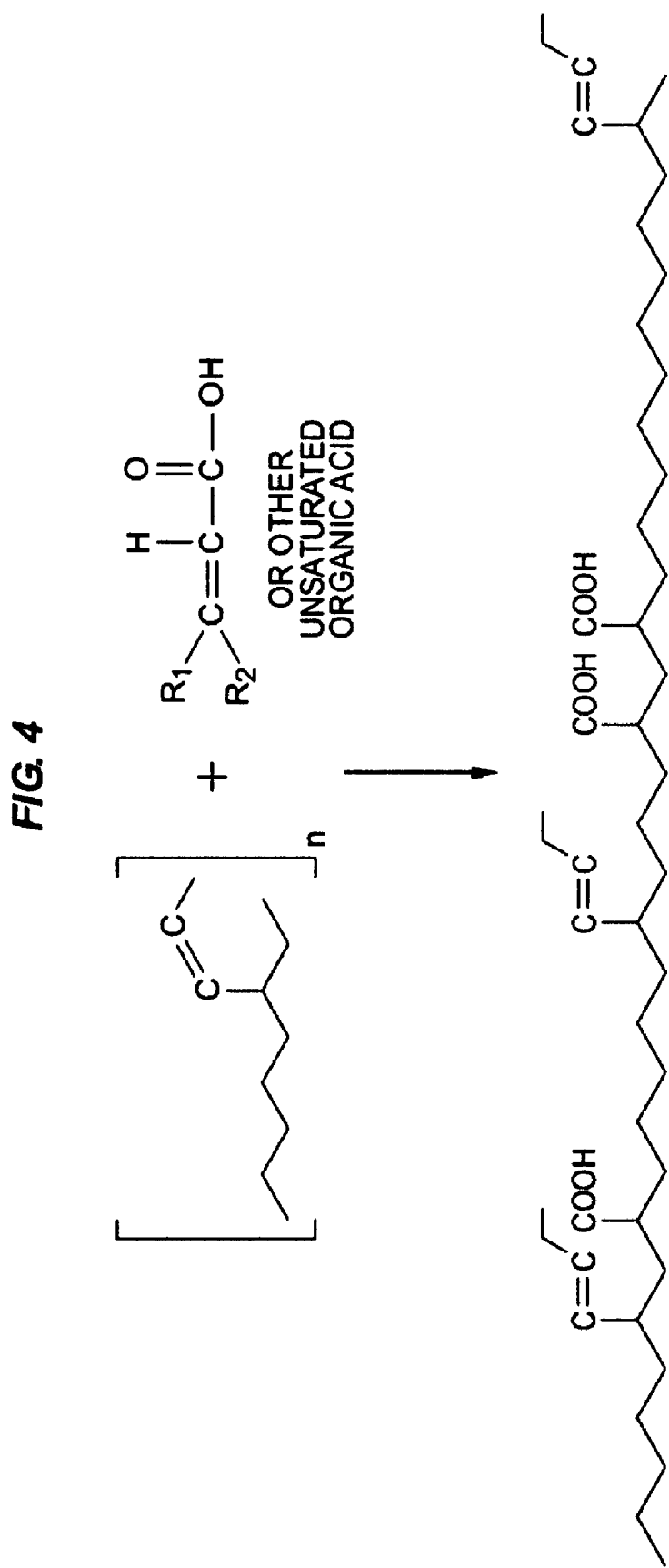

FIG. 4 illustrates a procedure for making a self-healing elastomer useful in the invention. EPDM/maleic acid elastomer blends exhibit some degree of self-healing capability when exposed to water at 100C for 24 hrs. EPDM/maleic acid blend produces an elastomer which shows that a cut introduced in an elastomer specimen heals due to the swelling and flow of the elastomer at elevated temperature. The healing of elastomer may not give a bond with high strength since the bonding is not due to chemical crosslinking, however it may have sufficient strength to create a seal. One example of potential application is for sealing the communication line in a wellbore when it passes through a packer elastomeric element.

Polymers Having Residual Ethylenic Unsaturation

The linear or branched polymer having residual ethylenic unsaturation functions as the main structural component of the elastomer, and, depending on its length, solubility parameter, and other factors, largely determines the oil-swellability of the composition and therefore the oil-swellability of the oilfield element. Examples of linear or branched chain polymers having residual ethylenic unsaturation include polymers of ethylene-propylene-diene monomer (EPDM), Other examples of linear or branched chain polymers having residual ethylenic unsaturation include natural rubber, polybutadiene, polyisoprene, ethylene-octene-based rubber and the like. Both cis and trans versions, as well as derivatized versions (side chains) of any of these may be used, as long as they do not affect the basic swellability properties sought in the final product elastomeric composition.

Ethylene-propylene-diene monomer polymers may comprise an ethylene copolymer or terpolymer of a ($C_3$-$C_{10}$) diene-olefin and a non-conjugated diene or triene, and may have an average molecular weight ranging from about 1000 to 40,000, or from 6,000 to 10,000, on which, at some stage of one of the processes, has been grafted or added physically 0.1 to 10 percent by weight, or 1.0 to 3.0 percent by weight of an ethylenically unsaturated carboxylic function.

More complex polymer substrates, often designated as interpolymers, may be prepared using a third component. The third component, if used, may be a polyene monomer selected from non-conjugated dienes and trienes. The non-conjugated diene component may have from 5 to 14 carbon atoms in the chain. Preferably, the diene monomer is characterized by the presence of a vinyl group in its structure and can include cyclic and bi-cyclo compounds. A mixture of more than one diene, more than one triene, or mixture of dienes and trienes may be used.

Representative dienes include, but are not limited to, non-conjugated dienes such as dicyclopentadiene, 5-ethylidene-2-norbornene, 5-methylene-2-norbornene 1,4-hexadiene, 1,4-cyclohexadiene, 1,5-heptadiene, and 1,6-octadiene.

The triene component, if used, will have at least two non-conjugated double bonds, and may have up to about 30 carbon atoms in the chain. Typical trienes useful in preparing elastomers useful in the invention include, but are not limited to, 1-isopropylidene-3a,4,7,7a-tetrahydroindene, 1-isopropylidenedicyclopentadiene, dehydro-isodicyclo-penta-diene, and 2-(2-methylene-4-methyl-3-pentenyl)-2.2.1-bicyclo-5-heptene.

Ethylenically Unsaturated Organic Monomers

The ethylenically unsaturated organic monomer having at least one reactive moiety selected from acid, acid anhydride, and acid salt functions mainly as a means to attach (graft) and/or blend in hydrophilic cites and lend water-swellability to the elastomer. A secondary function is to provide crosslinking cites, if the monomer comprises more than one ethylenically unsaturated moiety. In these embodiments, one of the unsaturated moieties may react with one unsaturation position on one chain, and the other unsaturated moiety may react with another polymer, in this way forming a 3-dimensional network. Alternatively, two (or more) unsaturated moieties in a monomer molecule may react with different unsaturation points of the same polymer chain.

The ethylenically unsaturated organic monomer has, or may be changed to have, carboxylic function, and may in certain embodiments comprise alpha- or beta-unsaturated ($C_4$-$C_{10}$)dicarboxylic acid, or anhydride or ester thereof, or monocarboxylic acid.

Examples of ethylenically unsaturated organic monomers having at least one reactive moiety selected from acid, acid anhydride, and acid salts include unsaturated mono- and dicarboxylic acids such as acrylic acid, methacrylic acid, crotonic acid, cinnamic acid, maleic acid, oleic acid, linoleic acid, linolenic acid, palmitoleic acid, fumaric acid, itaconic acid, maleic anhydride, chloromaleic acid, dimethylfumarte, chloromaleic anhydride and the like, as well as mixtures thereof.

Inorganic Swelling Agent

The elastomeric composition may comprise any number of additives, fillers, and the like, depending on the end use of the oilfield element. One such additive is an inorganic swelling agent, which functions to enhance the water-swellability of the elastomeric compositions useful in the invention.

Inorganic swelling agents useful for this purpose include alkali- and alkaline earth carbonates, such as carbonates of sodium (sodium carbonate; soda ash), potassium, lithium, beryllium, calcium, strontium magnesium, and the like, and combinations thereof. Without being limited thereby, it is believed that these materials contribute porosity to the elastomer when added in amounts up to about 5 parts per hundred weight of composition.

Organic Vulcanizing Agent

Apparatus in accordance with the invention include those wherein the elastomeric composition is vulcanized by an organic vulcanizing agent. An inorganic vulcanization agent may be included, such as one or more inorganic metallic oxides, and certain metals such as selenium. Heat, high energy radiation, chemical accelerators and other means may be used in conjunction with the organic vulcanization agent.

Examples of organic vulcanization elements useful in the invention may be selected from organic peroxides, such as dicumyl peroxide, tert-butyl cumyl peroxide, di-tert-butylperoxide, di(tert-butylperoxyisopropyl)benzene, dibenzoyl peroxide, di(2,4-dichlorobenzoyl)peroxide, di(4-methylbenzoyl)peroxide, 2,5-Dimethyl-2,5-di(tert-butylperoxy)hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, tert-butyl peroxybenzoate, and the like, and mixtures thereof. Various grades of these organic peroxides are available from AKZO NOBEL NV under the trade designations PERKADOX and TRIGONOX.

Halogenated quinones may be used as organic vulcanization elements, including those such as chlorinated quinones such as chloranil and 2,3-dichloro-5,6-dicyanoquinone, and the like, and mixtures thereof.

Nitrobenzenes, nitrotoluenes, nitroxylenes, and ortho-, meta-, and para-derivatives thereof may be used as organic vulcanization elements. Useful p-nitrobenzene derivatives include, but are not limited to, for example, p-nitrofluorobenzene, p-nitrochlorobenzene, p-nitrobromobenzene, p-nitroiodobenzene, p-nitrophenol, p-nitrobenzoic acid, and p-nitrobenzoic acid chloride. Other useful nitrobenzene derivatives include 2-methyl-4-nitrophenol, 2-trifluoromethyl-4-nitrophenol, 2-methyl-4-nitrobenzoic acid, 2-methyl-4-nitrobenzoic acid chloride, 2-trifluoromethyl-4-nitrobenzoic acid, 2-trifluoromethyl-4-nitrobenzoic acid chloride or acetanilide. A combination thereof may be suitably selected depending upon the particular purpose taking into consideration the reactivity and the availability of the materials. It should be mentioned that those exemplified here are only examples.

Highly Acidic Unsaturated Organic Monomers

The ethylenically unsaturated organic monomer having at least one reactive moiety selected from acid, acid anhydride, and acid salt may comprise a highly acidic unsaturated organic monomer, or such a monomer may be added to the polymerized elastomer. Such a monomer copolymerized with or simply added to EPDM, nitrile, or HNBR results in an elastomer that swells in low pH fluids such as completion fluids comprising zinc bromide. Example of useful highly acidic unsaturated monomers include, but are not limited to, sulfonic acids such as 2-acrylamido-2-methylpropane sulfonic acid (AMPS); 2-allyloxy-2-hydroxy-1-propane sulfonic acid; and vinylsulfonic acid. Addition of an inorganic swelling agent, such as the alkali- and alkaline earth carbonates mentioned above, may further enhance elastomer swelling in low pH fluids and high concentration brines.

Zwitterionic Monomers and Polymers

The base elastomer may include a zwitterionic polymer blended into the base elastomer, or a copolymer of zwitterionic monomers and unsaturated monomers like butadiene and isoprene, allowing production of a crosslinkable elastomer that swells in high salinity brines as well as in hydrocarbon oil-based fluids. A diene monomer may be included for crosslinking cites. "Zwitterionic monomer" means a polymerizable molecule containing cationic and anionic (charged) functionality in equal proportions, so that the molecule is net neutral overall. "Zwitterionic polymer" means a polymer composed from zwitterionic monomers and, possibly, other non-ionic monomer(s). Representative zwitterionic monomers include, but are not limited to:

N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-acrylamidopropyl-N-(3-sulfopropyl)-ammonium betaine,
N,N-dimethyl-N-acrylamidopropyl-N-(2-carboxymethyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'-(trimethylammonium)ethyl phosphate,
[(2-acryloylethyl)dimethylammonio]methyl phosphonic acid,
2-methacryloyloxyethyl phosphorylcholine,
2-[(3-acrylamidopropyl)dimethylammonio]ethyl 2'-isopropyl phosphate),
1-vinyl-3-(3-sulfopropyl)imidazolium hydroxide,
(2-acryloxyethyl)carboxymethyl methylsulfonium chloride,
1-(3-sulfopropyl)-2-vinylpyridinium betaine,
N-(4-sulfobutyl)-N-methyl-N,N-diallylamine ammonium betaine,
N,N-diallyl-N-methyl-N-(2-sulfoethyl)ammonium betaine, and the like.

Representative zwitterionic polymers useful in the invention include, but are not limited to, copolymers of 2-methacryloyloxyethyl-2'-trimethylammonium ethyl phosphate inner salt (MPC) with comonomers, including a variety of hydrophobic monomers, for instance $C_{4-18}$-alkyl methacrylate, and fluoroalkyl methacrylates.

Fillers and Optional Ingredients

It is well known in rubber industry that the use of fillers may reduce the swelling and permeability of polymeric materials. In general, the reduction in swelling and permeability increases as the filler concentration is increased. The permeability of polymeric materials may also depend on the shape and aspect ratio of the filler particles. Platelet like fillers such as nanoclays, preferably with small thickness (<0.1 micrometer) and length less than 200 micrometers, when aligned, may create a torturous path for diffusing fluid molecules and therefore may enhance the barrier properties of the resultant materials compared with barrier properties of raw polymer of the same composition and morphology.

Thermoplastic and Thermoset Polymeric Materials

Relatively non-elastic polymeric materials (relative to elastomers), such as thermoplastic and thermoset polymeric materials, may be combined or mixed with the elastomers, at a weight of from about 1 to 40 phr of the elastomer composition. Relatively non-elastic polymeric materials useful in the invention may be selected from natural and synthetic polymers, blends of natural and synthetic polymers, and layered versions of polymers, wherein individual layers may be the same or different in composition and thickness. The non-elastic polymer may comprise one or more thermoplastic polymers and/or one or more thermoset and/or thermally cured polymers, and combinations thereof.

A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of an oilfield element, the thermoplastic material may be heated above its softening temperature, and preferably above its melting temperature, to cause it to flow and form the desired shape of the oilfield element in conjunction with the elastomer. After the desired shape is formed, the thermoplastic substrate is cooled and solidified. In this way, thermoplastic materials (including thermoplastic elastomers) can be molded into various shapes and sizes.

Moldable thermoplastic materials that may be used are those having a high melting temperature, good heat resistant properties, and good toughness properties such that the oilfield element or assemblies containing these materials operably withstand oilfield conditions without substantially deforming or disintegrating.

Thermoplastic polymers useful as polymeric matrix materials are those able to withstand expected temperatures, temperature changes, and temperature differentials (for example a temperature differential from one surface of a gasket to the other surface material to the other surface) during use, as well as expected pressures, pressure changes, and pressure differentials during use, with a safety margin on temperature and pressure appropriate for each application.

Examples of thermoplastic materials suitable for use in the invention in ojifield elements according to the present invention include polyolefins, polyamides, polyesters, thermoplastic polyurethanes and polyurea urethanes, PP, PE, PP-PE copolymer, PVC and other polyolefms, polyamides, polyetheretherketones (PEEK), polyaryletherketones (PAEK), polyetherimides (PEI), copolymers of tetrafluoroethylene and perfluorovinylether (PFA), perfluoroalkoxy copolymers (MFA), polycarbonates, polyetherimides, polyesters, polysulfones, polystyrenes, acrylonitrile-butadiene-styrene block copolymers, acetal polymers, polyaxnides, copolymers, blends, and other combinations thereof, and the like. Of this list, polyamides and polyesters may provide better performance. Polyamide materials are useful at least because they are inherently tough and heat resistant, and are relatively inexpensive. Polyamide resin materials may be characterized by having an amide group, i.e., —C(O)NH—. Various types of polyamide resin materials, i.e., nylons, can be used, such as nylon 6/6 or nylon 6. Of these, nylon 6 may be used if a phenolic-based coating is used because of the excellent adhesion between nylon 6 and phenolic-based coatings. Nylon 6/6 is a condensation product of adipic acid and hexamethylenediamine. Nylon 6/6 has a melting point of about 264° C. and a tensile strength of about 770 kg/cm². Nylon 6 is a polymer of ε-caprolactam. Nylon 6 has a melting point of about 223° C. and a tensile strength of about 700 kg/cm². Examples of commercially available nylon resins useable in oilfield elements according to the present invention include those known under the trade designations VYDYNE from Solutia, St. Louis, Mo.; ZYTEL and MINLON both from DuPont, Wilmington, Del.; TROGAMID T from Degussa Corporation, Parsippany, N.J.; CAPRON from BASF, Florham Park, N.J.; NYDUR from Mobay, Inc., Pittsburgh, Pa.; and ULTRAMID from BASF Corp., Parsippany, N.J. Mineral-filled thermoplastic materials can be used, such as the mineral-filled nylon 6 resin MINLON, from DuPont.

Suitable thermoset (thermally cured) polymers for use in elastomeric compositions of the invention include phenolic resins, epoxy resins, phenoxy, phenolic, ester, polyurethane, polyurea, and the like. Thermoset molding compositions known in the art are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness.

Adhesion Promoters, Coupling Agents and Other Optional Ingredients

The elastomeric composition may comprise other ingredients in addition to the monomers, polymers, and other ingredients already mentioned, such as fillers, coupling agents, suspension agents, pigments, and the like.

Besides the polymeric material, the elastomer composition may include an effective amount of a fibrous reinforcing material. Herein, an "effective amount" of a fibrous reinforcing material is a sufficient amount to impart at least improvement in the physical characteristics of the oilfield element, i.e., heat resistance, toughness, flexibility, stiffness, shape control, adhesion, etc., but not so much fibrous reinforcing material as to give rise to any significant number of voids and detrimentally affect the structural integrity of the oilfield element. The amount of the fibrous reinforcing material in the elastomeric composition may be any amount that does not substantially detrimentally affect the desired swellability properties achieved by the elastomeric composition, and may be within a range of about 1-40 parts, or within a range of about 5-35 parts, or within a range of about 15-30 parts by weight, for every 100 parts by weight of polymer.

The fibrous reinforcing material may be in the form of individual fibers or fibrous strands, or in the form of a fiber mat or web. The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials.

By "heat resistant" organic fibers, it is meant that useable organic fibers must be resistant to melting, or otherwise breaking down, under the conditions of manufacture and use of the oilfield elements of the present invention. Examples of useful natural organic fibers include wool, silk, cotton, or cellulose. Examples of useful synthetic organic fibers include polyvinyl alcohol fibers, polyester fibers, rayon fibers, polyamide fibers, acrylic fibers, aramid fibers, or phenolic fibers. Generally, any ceramic fiber is useful in applications of the present invention. An example of a ceramic fiber suitable for the present invention is NEXTEL which is commercially available from 3M Co., St. Paul, Minn. Glass fibers may be used, at least because they impart desirable characteristics to the oilfield elements and are relatively inexpensive. Furthermore, suitable interfacial binding agents exist to enhance adhesion of glass fibers to thermoplastic materials. Glass fibers are typically classified using a letter grade. For example, E glass (for electrical) and S glass (for strength). Letter codes also designate diameter ranges, for example, size "D" represents a filament of diameter of about 6 micrometers and size "G" represents a filament of diameter of about 10 micrometers. Useful grades of glass fibers include both E glass and S glass of filament designations D through U. Preferred grades of glass fibers include E glass of filament designation "G" and S glass of filament designation "G." Commercially available glass fibers are available from Specialty Glass Inc., Oldsmar, Fla.; Johns Manville, Littleton, Colorado; and Mo-Sci Corporation, Rolla, Mo. If glass fibers are used, the glass fibers may be accompanied by an interfacial binding agent, i.e., a coupling agent, such as a silane coupling agent, to improve the adhesion to the thermoplastic material. Examples of silane coupling agents include "Z-6020" and "-6040," available from Dow Corning Corp., Midland, Mich.

The elastomer compositions of the present invention may further include an effective amount of a toughening agent. This will be preferred for certain applications. A primary purpose of the toughening agent is to increase the impact strength of the oilfield elements. By "an effective amount of a toughening agent" it is meant that the toughening agent is present in an amount to impart at least improvement in toughness without the component becoming too flexible. Elastomeric portions of oilfield elements of the present invention may contain between about 1 and 30phr of a toughening agent. For example, the less elastomeric characteristics a toughening agent possesses, the larger quantity of the toughening agent may be required to impart desirable properties to the oilfield elements of the present invention. Toughening agents that impart desirable stiffness characteristics to the oilfield elements of the present invention include rubber-type polymers and plasticizers. Of these, the rubber toughening agents may be mentioned, and synthetic elastomers. Examples of preferred toughening agents, i.e., rubber tougheners and plasticizers, include: toluenesulfonamide derivatives (such as a mixture of N-butyl- and N-ethyl-p-toluenesulfonamide, commercially available from Akzo Chemicals, Chicago, Ill., under the trade designation KETJENFLEX 8; styrene butadiene copolymers; polyether backbone polyamides (commercially available from Atochem, Glen Rock, N.J., under the trade designation PEBAX); rubber-polyamide copolymers (commercially available from DuPont, Wilmington, Del., under the trade designation ZYTEL FN); and functionalized triblock polymers of styrene-(cthylene butylene)-styrene (commercially available from Shell Chemical Co., Houston, Tex., under the trade designation KRATON FG1901); and mixtures of these materials. Of this group, rubber-polyamide copolymers and styrene-(ethylene butylene)-styrene triblock polymers may be used, at least because of the beneficial characteristics they may impart. Commercial compositions of toughener and thermoplastic material are available, for example, under the designation ULTRAM1D from BASF Corp., Parsippany, N.J. Specifically, ULTRAMID B3ZG6 is a nylon resin containing a toughening agent and glass fibers that is useful in the present invention.

Other materials that may be added to the elastomeric composition for certain applications of the present invention include inorganic or organic fillers. Inorganic fillers are also known as mineral fillers. A filler is defined as a particulate material, typically having a particle size less than about 100 micrometers, preferably less than about 50 micrometers, but larger than about 1 micrometer. Examples of useful fillers for applications of the present invention include carbon black, calcium carbonate, silica, calcium metasilicate, cryolite, phenolic fillers, or polyvinyl alcohol fillers. If a filler is used, it is theorized that the filler may fill in between reinforcing fibers if used, and may prevent crack propagation through the elastomer. Typically, a filler would not be used in an amount greater than about 20 percent based on the weight of the elastomeric composition.

Other useful materials or components that may be added to the elastomeric compositions for certain applications of the present invention include, but are not limited to, oils, antistatic agents, flame retardants, heat stabilizers, ultraviolet stabilizers, internal lubricants, antioxidants, and processing aids. One would not typically use more of these components than needed for desired results.

The apparatus of the invention, in particular the elastomeric elements, if filled with fillers, may also contain coupling agents. When an organic polymeric matrix has an inorganic filler, a coupling agent may be desired. Coupling agents may operate through two different reactive functionalities: an organofunctional moiety and an inorganic functional moiety. When a resin/filler mixture is modified with a coupling agent, the organofunctional group of the coupling agent becomes bonded to or otherwise attracted to or associated with the uncured resin. The inorganic functional moiety appears to generate a similar association with the dispersed inorganic filler. Thus, the coupling agent acts as a bridge between the organic resin and the inorganic filler at the resin/filler interface. In various systems this results in:

1. Reduced viscosity of the resin/filler dispersion, generally facilitating application.

2. Enhanced suspendability of the filler in the resin, i.e., decreasing the likelihood that suspended or dispersed filler will settle out from the resin/filler suspension during storing or processing to manufacture oilfield elements.

3. Improved product performance due to enhanced operation lifetime, for example through increased water resistance or general overall observed increase in strength and integrity of the bonding system.

Herein, the term "coupling agent" includes mixtures of coupling agents. An example of a coupling agent that may be found suitable for this invention is gamma-methacryloxypropyltrimethoxy silane known under the trade designation SILQUEST A 174 from GE Silicones, Wilton, Conn. Other suitable coupling agents are zircoaluminates, and titanates.

The elastomeric composition may include a shape stabilizer, i.e., a thermoplastic polymer with a melting point higher than that described above for the thermoplastic material. Suitable shape stabilizers include, but are not limited to, poly(phenylene sulfide), polyimides, and polyaramids. An example of a preferred shape stabilizer is polyphenylene oxide nylon blend commercially available from GE Plastics, Pittsfield, Mass., under the trade designation GTX 910.

Oilfield Elements and Assemblies

An "oilfield assembly", as used herein, is the complete set or suite of oilfield elements that may be used in a particular job. All oilfield elements in an oilfield assembly may or may not be interconnected, and some may be interchangeable.

An "oilfield element" includes, but is not limited to one or more items or assemblies selected from zonal isolation tool elastomeric elements, packer elements, blow out preventer elements, self-healing cements, proppants, O-rings, T-rings, electric submersible pump protectors, centralizers, hangers, plugs, plug catchers, check valves, universal valves, spotting valves, differential valves, circulation valves, equalizing valves, safety valves, fluid flow control valves, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, and the like.

A "packer" is a device that can be run into a wellbore with a smaller initial outside diameter that then expands externally to seal the wellbore. Packers employ flexible, elastomeric seal elements that expand. The two most common forms are the production or test packer and the inflatable packer. The expansion of the former may be accomplished by squeezing the elastomeric elements (somewhat doughnut shaped) between two plates or between two conical frusta pointed inward, forcing the elastomeric elements'sides to bulge outward. The expansion of the latter may be accomplished by pumping a fluid into a bladder, in much the same fashion as a balloon, but having more robust construction. Production or test packers may be set in cased holes and inflatable packers may be used in open or cased holes. They may be run down into the well on wireline, pipe or coiled tubing. Some packers are designed to be removable, while others are permanent. Permanent packers are constructed of materials that are easy to drill or mill out. A packer may be used during completion to isolate the annulus from the production conduit, enabling controlled production, injection or treatment. A typical packer assembly incorporates a means of securing the packer against the casing or liner wall, such as a slip arrangement, and a means of creating a reliable hydraulic seal to isolate the annulus, typically by means of an expandable elastomeric element. Packers are classified by application, setting method and possible retrievability. Inflatable packers are capable of relatively large expansion ratios, an important factor in through-tubing work where the tubing size or completion components can impose a significant size restriction on devices designed to set in the casing or liner below the tubing. Seal elements may either be bonded-type or chevron-type, and may employ seal elements comprising one or more elastomeric compositions described herein, and these elastomeric compositions may comprise one or more thermoplastic polymers, such as the polytetrafluoroethylene known under the trade designation TEFLON, available from E.I. DuPont de Nemours & Company; the polyphenylene sulfide thermoplastics known under the trade designation RYTON and polyphenylene sulfide-based alloys known under the trade designation XTEL both available from Chevron Phillips Chemical Company LP. Both bond-type and chevron-type seal elements are available from Schlumberger.

FIGS. 5-10 illustrate several oilfield assemblies having one or more oilfield elements that may benefit from use of an elastomer composition as described herein. When an oilfield element is referred to by numeral, if that oilfield element may comprise an elastomeric composition as described herein it will be indicated with an asterisk (*). It will be understood that not all of the described oilfield assemblies that may comprise a polymeric matrix need be the same in composition; indeed, not all of the possible oilfield elements need have an elastomeric composition. In some embodiments, perhaps only the protector bag of a submersible pump, for example, may be comprised of an elastomeric composition. Further, when an oilfield element is mentioned as being comprised of an elastomeric composition, the elastomeric composition may itself be a component of a larger structure, for example coated onto or placed adjacent another material, for example a metallic component.

Figure 5:
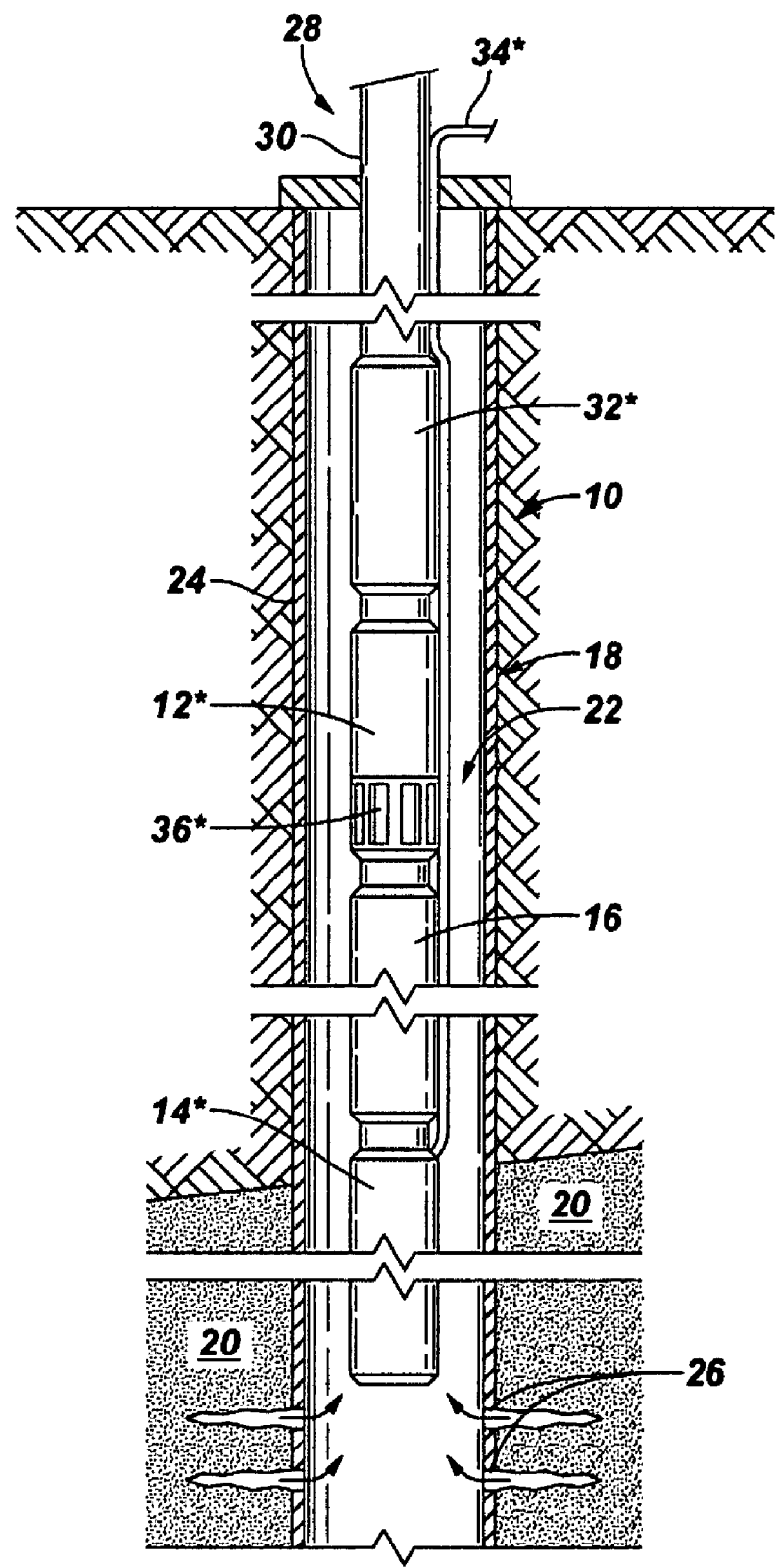
FIG. 5 is a front elevation view of an exemplary electrical submersible pump disposed within a wellbore.

FIG. 5 illustrates a first oilfield assembly 10 designed for deployment in a well 18 within a geological formation 20 containing desirable production fluids, such as petroleum. In a typical application, a wellbore 22 is drilled and lined with a wellbore casing 24. Wellbore casing 24 typically has a plurality of openings 26, for example perforations, through which production fluids may flow into wellbore 22.

Oilfield assembly 10 is deployed in wellbore 22 by a deployment system 28 that may have a variety of forms and configurations. For example, deployment system 28 may comprise tubing 30 connected to pump 12* by a connector 32*. Power is provided to a submersible motor 14* via a power cable 34*. Motor 14*, in turn, powers centrifugal pump 12*, which draws production fluid in through a pump intake 36* and pumps the production fluid to the surface via tubing 30.

It should be noted that the illustrated oilfield assembly 10 is merely an exemplary embodiment. Other oilfield elements may be added to the oilfield assembly, and other deployment systems may be implemented. Additionally, the production fluids may be pumped to the surface through tubing 30 or through the annulus formed between deployment system 28 and wellbore casing 24. In any of these configurations of oilfield assembly 10, it may be desirable to be able to use two or more centrifugal pump stages having different operating characteristics. Tubing 30 may be replaced by jointed pipe, which may include flanges and in that case flange gaskets*.

In certain embodiments, oilfield assembly 10 may have one or more sections of motor protector 16* disposed about motor 14*. A schematic cross-sectional view of an exemplary embodiment of oilfield assembly 10 is provided in FIG. 6. As illustrated, oilfield assembly 10 comprises pump 12*, motor 14*, and various motor protection components disposed in a housing 38. Pump 12* is rotatably coupled to motor 14* via a shaft 40, which extends lengthwise through the housing 38 (for example, one or more housing sections coupled together). Oilfield assembly 10 and shaft 40 may have multiple sections, which can be intercoupled via couplings and flanges. For example, shaft 40 has couplings 42* and 44* and an intermediate shaft section 46 disposed between pump 12* and motor 14*.

A variety of seals, filters, absorbent assemblies and other protection elements also may be disposed in housing 38 to protect motor 14*. A thrust bearing 48* is disposed about shaft 40 to accommodate and support the thrust load from pump 12*. A plurality of shaft seals, such as shaft seals 50* and 52*, are also disposed about shaft 40 between pump 12* and motor 14* to isolate a motor fluid 54 in motor 14* from external fluids, such as well fluids and particulates. Shaft seals 50* and 52* also may include stationary and rotational components, which may be disposed about shaft 40 in a variety of configurations. Oilfield assembly 10 also may include a plurality of moisture absorbent assemblies, such as moisture absorbent assemblies 56, 58, and 60, disposed throughout housing 38 between pump 12* and motor 14*. These moisture absorbent assemblies 56, 58, and 60 absorb and isolate undesirable fluids (for example, water, $H_2S$, and the like) that have entered or may enter housing 38 through shaft seals 50* and 52* or through other locations. For example, moisture absorbent assemblies 56 and 58 may be disposed about shaft 40 at a location between pump 12* and motor 14*, while moisture absorbent assembly 60 may be disposed on an opposite side of motor 14* adjacent a protector bag 64*. In addition, the actual protector section above the motor may include a hard bearing head with shedder.

Figure 6:
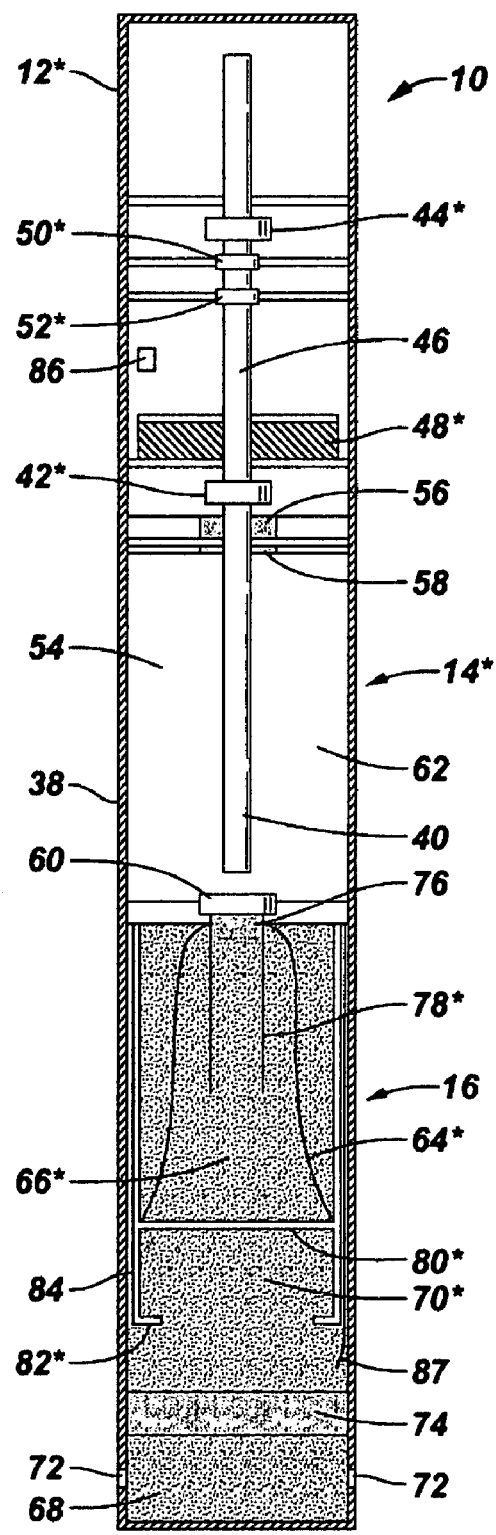
FIG. 6 is a diagrammatical cross-section of the pump of FIG. 5 having an elastomenc composition protector bag in accordance with the invention to separate well fluid from motor fluid, which is positively pressurized within the motor housing.

As illustrated in FIG. 6, motor fluid 54 is in fluid communication with an interior 66* of protector bag 64*, while well fluid 68 is in fluid communication with an exterior 70* of protector bag 64*. Accordingly, protector bag 64* seals motor fluid 54 from well fluid 68, while positively pressurizing motor fluid 54 relative to the well fluid 68 (e.g., a 50 psi pressure differential). The ability of elastomeric protector bag 64* to stretch and retract ensures that motor fluid 54 maintains a higher pressure than that of well fluid 68. A separate spring assembly or biasing structure also may be incorporated in protector bag 64* to add to the resistance, which ensures that motor fluid 54 maintains a higher pressure than that of well fluid 68.

Protector bag 64* may embody a variety of structural features, geometries and materials as known in the art to utilize the pressure of well fluid 68 in combination with the stretch and retraction properties of protector bag 64* to positively pressurize motor fluid 54. Initially, motor fluid 54 is injected into motor 14* and protector bag 64* is pressurized until a desired positive pressure is obtained within motor 14*. For example, oilfield assembly 10 may set an initial pressure, such as 25-100 psi, prior to submerging into the well. An exterior chamber 70 adjacent protector bag 64* also may be filled with fluid prior to submerging the system into the well. Well fluid 68 enters housing 38 through ports 72 and mixes with this fluid in exterior chamber 70 as oilfield assembly 10 is submersed into the well. Protector bag 64* also may have various protection elements to extend its life and to ensure continuous protection of motor 14*. For example, a filter 74 may be disposed between ports 72 and exterior chamber 70 of protector bag 64* to filter out undesirable fluid elements and particulates in well fluid 68 prior to fluid communication with exterior chamber 70. A filter 76 also may be provided adjacent interior 66* of protector bag 64* to filter out motor shavings and particulates. As illustrated, filter 76 is positioned adjacent moisture absorbent assembly 60 between motor cavity 62 and interior 66* of protector bag 64*. Accordingly, filter 76 prevents solids from entering or otherwise interfering with protector bag 64*, thereby ensuring that protector bag 64* is able to expand and contract along with volume variations in the fluids.

A plurality of expansion and contraction stops also may be disposed about protector bag 64* to prevent over and under extension and to prolong the life of protector bag 64*. For example, a contraction stop 78* may be disposed within interior 66* of protector bag 64* to contact an end section 80* and limit contraction of protector bag 64*. An expansion stop 82* also may be provided at exterior 70* of protector bag 64* to contact end section 80* and limit expansion of the protector bag. These contraction and expansion stops 78* and 82* may have various configurations depending on the elastomer utilized for protector bag 64* and also depending on the pressures of motor fluid 54 and well fluid 68. A housing 84* also may be disposed about exterior 70* to guide protector bag 64* during contraction and expansion and to provide overall protection about exterior 70*.

As oilfield assembly 10 is submersed and activated in the downhole environment, the internal pressure of motor fluid 54 may rise and/or fall due to temperature changes, such as those provided by the activation and deactivation of motor 14*. A valve 86* may be provided to release motor fluid 54 when the pressurization exceeds a maximum pressure threshold. In addition, another valve may be provided to input additional motor fluid when the pressurization falls below a minimum pressure threshold. Accordingly, the valves maintain the desired pressurization and undesirable fluid elements are repelled from motor cavity 62 at the shaft seals 50* and 52*. Oilfield assembly 10 also may have a wiring assembly 87* extending through housing 38 to a component adjacent protector bag 64*. For example, a variety of monitoring components may be disposed below protector bag 64* to improve the overall operation of oilfield assembly 10. Exemplary monitoring components comprise temperature gauges, pressure gauges, and various other instruments, as should be appreciated by those skilled in the art.

Figure 7:
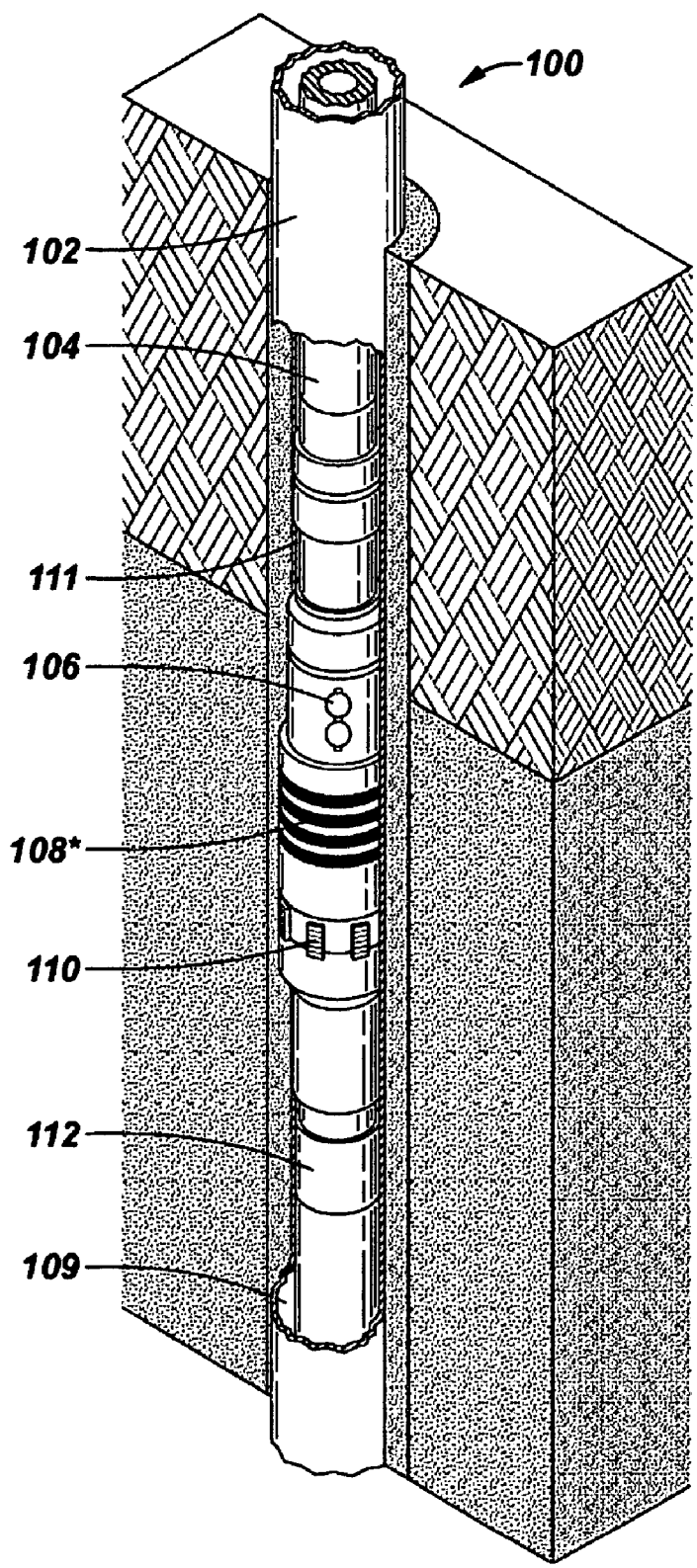
FIG. 7 is a schematic side elevation view, partially in cross-section, of a packer having elastomeric composition packer elements in accordance with the invention.

FIG. 7 is a schematic perspective view, partially in cross-section, and not necessarily to scale, of another oilfield assembly 100 in accordance with the invention, in this case a packer. Although oilfield assembly 100 comprises in many instances more than one oilfield element, such as production tubing 104 and packer elements 108, oilfield assembly 100 is often referred to as a packer, and therefore this oilfield assembly may be considered an oilfield element which is part of a larger oilfield assembly, such as oilfield assembly 10 of FIGS. 5 and 6. A production liner or casing 102 is shown, partially broken away to reveal production tubing 104, hold-down slips 106, set-down slips 110, connector 112, and a plurality of packer elements 108* which, when expanded, produce a hydraulic seal between a lower annulus 109 and an upper annulus 111.

FIGS. 8A and 8B illustrate how two actuation arrangements may be used to directly override two flapper-style check valves, allowing uphole flow in a flow reversing oilfield assembly. The flow reversing oilfield assembly 150 illustrated schematically in FIG. 8A may include a motor 152*, motor shaft 153, and movable valve gate 156 positioned in a secondary channel 154, which moves dual flapper actuators 157 and 159, each having a notch 158 and 160, respectively. Movement up of shaft 153, gate 156, actuators 157 and 159, and notches 158 and 160 mechanically opens flappers 162 and 164, allowing reverse flow up through lower end 170 of tubing primary flow channel 151. O-ring seals 166* and 168* isolate production fluid from motor fluid 172. The flow reversing oilfield assembly 180 illustrated in FIG. 8B uses dual solenoids 184 and 182 to charge a hydraulic system and release the pressure. When the hydraulic system is charged, the hydraulic pressure in conduits 185, 185a, and 185b shift pistons 191 and 192, mechanically opening flappers 162 and 164, while high pressure below flapper 165 opens it, allowing reverse flow up tubing primary channel 151. When it is desired to stop reverse flow, or power or communication is lost, solenoid 184 is activated, releasing hydraulic pressure in conduits 185, 185a, and 185b, allowing flappers 162 and 164 to close in safe position. Note that an oil compensation system 194 may be used to protect and lubricate the motor, gears, and other mechanical parts, such as ball 193 * and spring 195 * of a check valve. Alternatively, these parts may be comprised of coated polymeric substrates in accordance with the invention. Various O-ring seals, such as seals 196* and 197* may be comprised of coated polymeric substrate, such as coated elastomers.

Figure 9A:
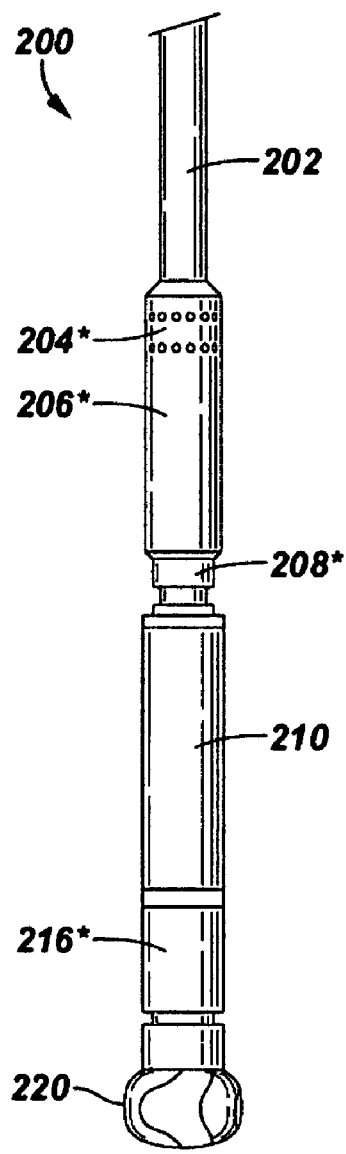
FIGS. 9A and 9B are schematic side elevation views of two bottom hole assemblies which may utilize elastomeric composition components in accordance with the invention.
Figure 9B:
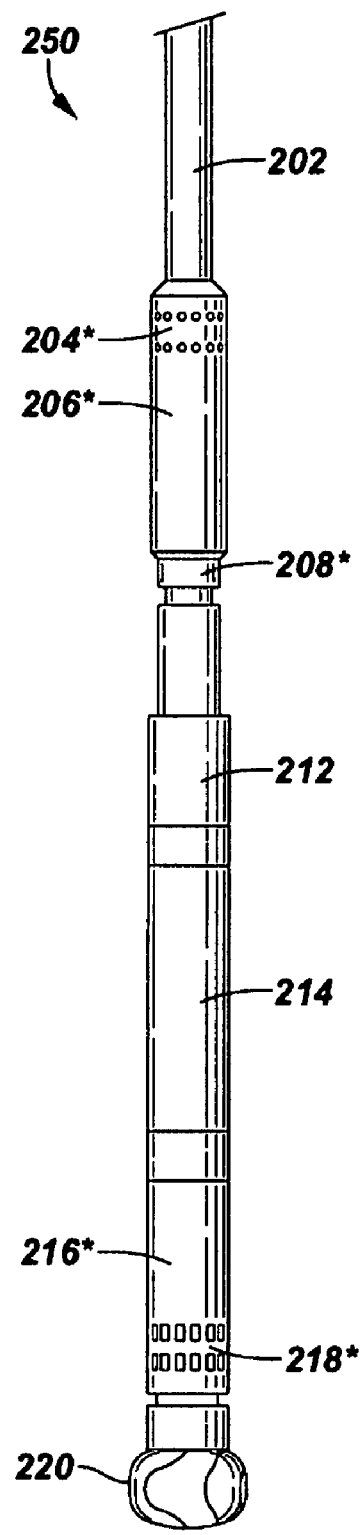

FIGS. 9A and 9B illustrate two oilfield assemblies 200 and 250 known as bottom hole assemblies, or BHAs. Bottom hole assemblies have many wellbore elements that may benefit from use of elastomeric compositions in accordance with the teachings of the invention. The lower portion of the drillstring, consisting of (from the bottom up in a vertical well) the bit, bit sub, a mud motor (in certain cases), stabilizers, drill collars, heavy-weight drillpipe, jarring devices ("jars") and crossovers for various threadforms. The bottomhole assembly must provide force for the bit to break the rock (weight on bit), survive a hostile mechanical environment and provide the driller with directional control of the well. Oftentimes the assembly includes a mud motor, directional drilling and measuring equipment, measurements-while-drilling (MWD) tools, logging-while-drilling (LWD) tools and other specialized devices. A simple BHA may comprise a bit, various crossovers, and drill collars, however they may include many other wellbore elements leading to a relatively complex wellbore assembly.

Each oilfield assembly 200 and 250 may comprise tubing 202, a connector 204*, a check valve assembly 206*, and a pressure disconnect 208*. Oilfield assembly 200 is a straight hole BHA, and includes drill collars 210, a mud pump 216*, and a drill bit 220. Oilfield assembly 250 is a BHA for buildup and horizontal bore holes, and includes an orienting tool 212*, an MWD section in a non-magnetic drill collar 214, mud pump 216*, and drill bit 220, as well as an adjustable bent housing 218*.

Figure 10A:
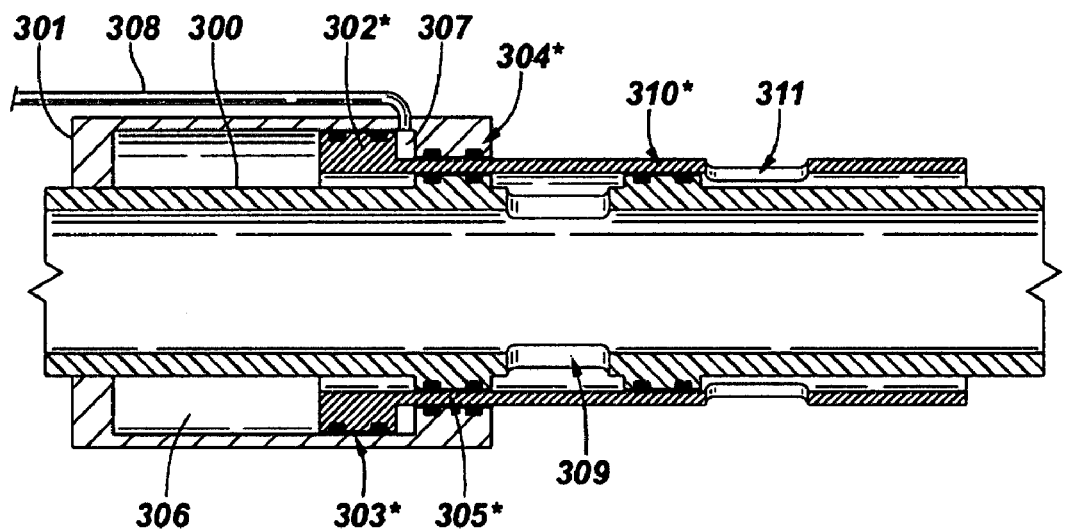
FIGS. 10A and 10B are schematic cross-sectional views of a flow control valve that may be utilized to control the flow of petroleum production or well fluids out of specific zones in a well or reservoir, or injection of fluid into specific zones, the valve utilizing elastomeric composition components in accordance with the invention.
Figure 10B:
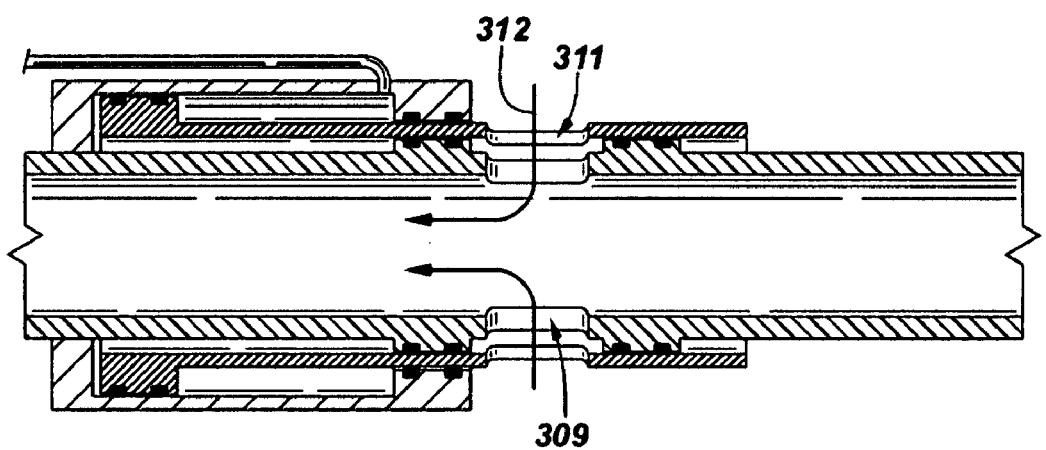
Figure 11:
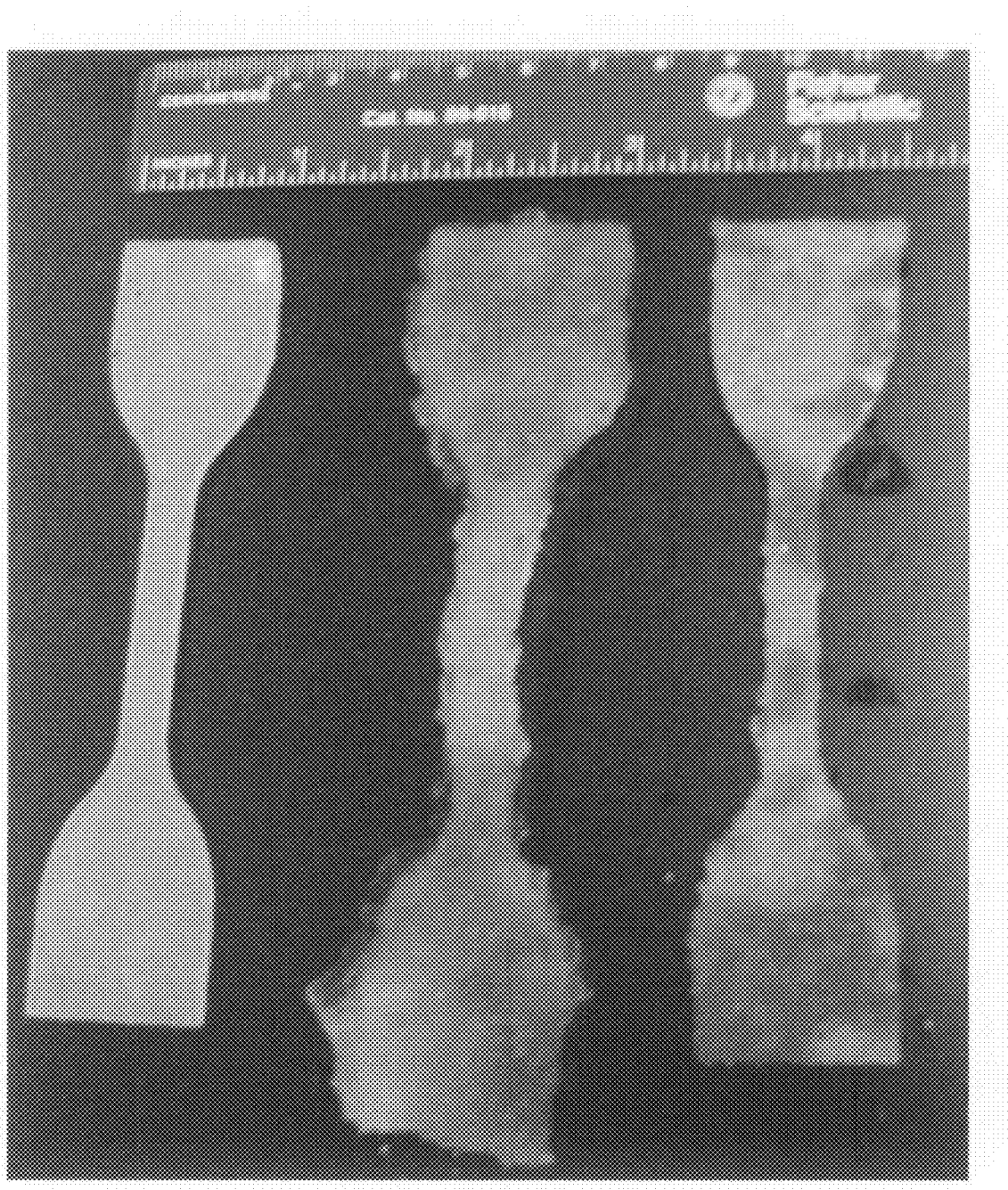
FIG. 11 is a photograph of swelling test samples of prior art hydrogel filled elastomers, illustrating swelling when exposed to water and hydrogel particle migration to the surface of the elastomer causing the elastomer to develop blisters, fissures and eventual disintegration of the material.

FIGS. 10A and 10B are schematic cross-sectional views of a flow control valve that may be utilized to control the flow of petroleum production or well fluids out of specific zones in a well or reservoir, or injection of fluid into specific zones, the valve utilizing elastomeric compositions in accordance with the invention. These flow control valves may be operated by forces produced and controlled hydraulically, electrically or by a hybrid combination of appropriate electric and hydraulic components.

FIGS. 10A and 10B illustrate one embodiment of a hydraulically actuated valve. An inner tubular member 300 is contained within an actuator housing 301. A sliding sleeve 302 is equipped with sliding seals 303*, 304* and 305*, thereby defining a confined volume chamber 306 and a controlled volume chamber 307. If confined volume chamber 306 is pre-charged with a relatively inert gas such as nitrogen at sufficiently high pressure compared to the pressure in controlled volume chamber 307, then sliding sleeve 302 will be forced to the right, thereby closing fluid flow through an opening 309 in inner tubing 300 and an opening 311 in sliding sleeve 302. A seal 310 prevents the flow of fluid between tubular member 300 and sliding sleeve 302. If hydraulic oil is introduced into a tube 308 at a sufficiently high pressure then the force produced within controlled volume chamber 307 will be sufficient to overcome the force due to the pressurized gas in confined volume chamber 306 thereby resulting in sliding sleeve 302 moving to the left as illustrated in FIG. 10B. In FIG. 10B the movement of sliding sleeve 302 is sufficient to position opening 309 of inner tubular member 300 directly in-line with opening 311 in sliding sleeve 302. In this controlled configuration production fluid 312 can enter into the tubular member and thereby be unimpeded to flow into the tubing and up to the surface, assuming there is a fluid flow path and that the pressure is sufficient to lift the fluid to surface.

Sliding seals 303, 304, and 305 may be comprised of at least one of: O-rings, T-seals, chevron seals, metal spring energized seals, or combination of these to make a seal stack.

In application, sealing elements tend to adhere to one or both interface metal surfaces of the valve or sealed assembly. This can result in fluid or gas leaking through static of dynamic valve seals. In static, or non-moving seals, destructive mechanical stresses may also result from the difference in coefficient of thermal expansion of the mating parts made of differing materials, for example elastomers, polymers, metals or ceramics, or composites of these materials. Although the sealing element may change very little in size between hot and cold conditions, its expansion or contraction is relatively insignificant compared to the adjacent metal sealing elements of the valve, and since sealing elements are mechanically stressed with every thermal cycle, the sealing element eventually fractures thereby allowing fluid or gas to escape.

As may be seen by the exemplary embodiments illustrated in FIGS. 5-10 there are many possible uses of apparatus of the invention comprising elastomeric compositions as described and formed into shaped forms, such as oilfield elements and assemblies. Alternatives are numerous. For example, certain electrical submersible pumps, which are modified versions of a pumping system known under the trade designation AXIA, available from Schlumberger Technology Corporation, may feature a simplified two-component pump-motor configuration. Pumps of this nature generally have two stages inside a housing, and a combined motor and protector bag, which may be comprised of an apparatus of the invention. The combined motor and protector assembly is known under the trade designation PRO-MOTOR and may be prefilled in a controlled environment.

Other alternative electrical submersible pump configurations that may benefit from components comprised of elastomeric compositions described herein include an ESP deployed on cable, an ESP deployed on coiled tubing with power cable strapped to the outside of the coiled tubing (the tubing acts as the producing medium), and more recently a system known under the trade designation REDACOIL having a power cable deployed internally in coiled tubing. Certain pumps may have "on top" motors that drive separate pump stages, all pump stages enclosed in a housing. A separate protector bag is provided, as well as an optional pressure/temperature gauge. Also provided in this embodiment may be a sub-surface safety valve (SSSV) and a chemical injection mandrel. A lower connector may be employed, which may be hydraulically releasable with the power cable, and may include a control line and instrument wire feedthrough. A control line set packer completes this embodiment. The technology of bottom intake ESPs (with motor on the top) has been established over a period of years. It is important to securely install pump stages, motors, and protector within coiled tubing, enabling quicker installation and retrieval times plus cable protection and the opportunity to strip in and out of a live well. This may be accomplished using a deployment cable, which may be a cable known under the trade designation REDACOIL including a power cable and flat pack with instrument wire and one or more, typically three hydraulic control lines, one each for operating the lower connector release, SSSV, and packer setting/chemical injection. Any one or more of the deployment cable, power cable, SSSV, control line set packer, chemical injection mandrel, and the like may comprise a swellable elastomeric composition, either in their O-ring seals or gaskets, as jackets for cables, as protector bags, and the like.

EXAMPLES

Figure 12:
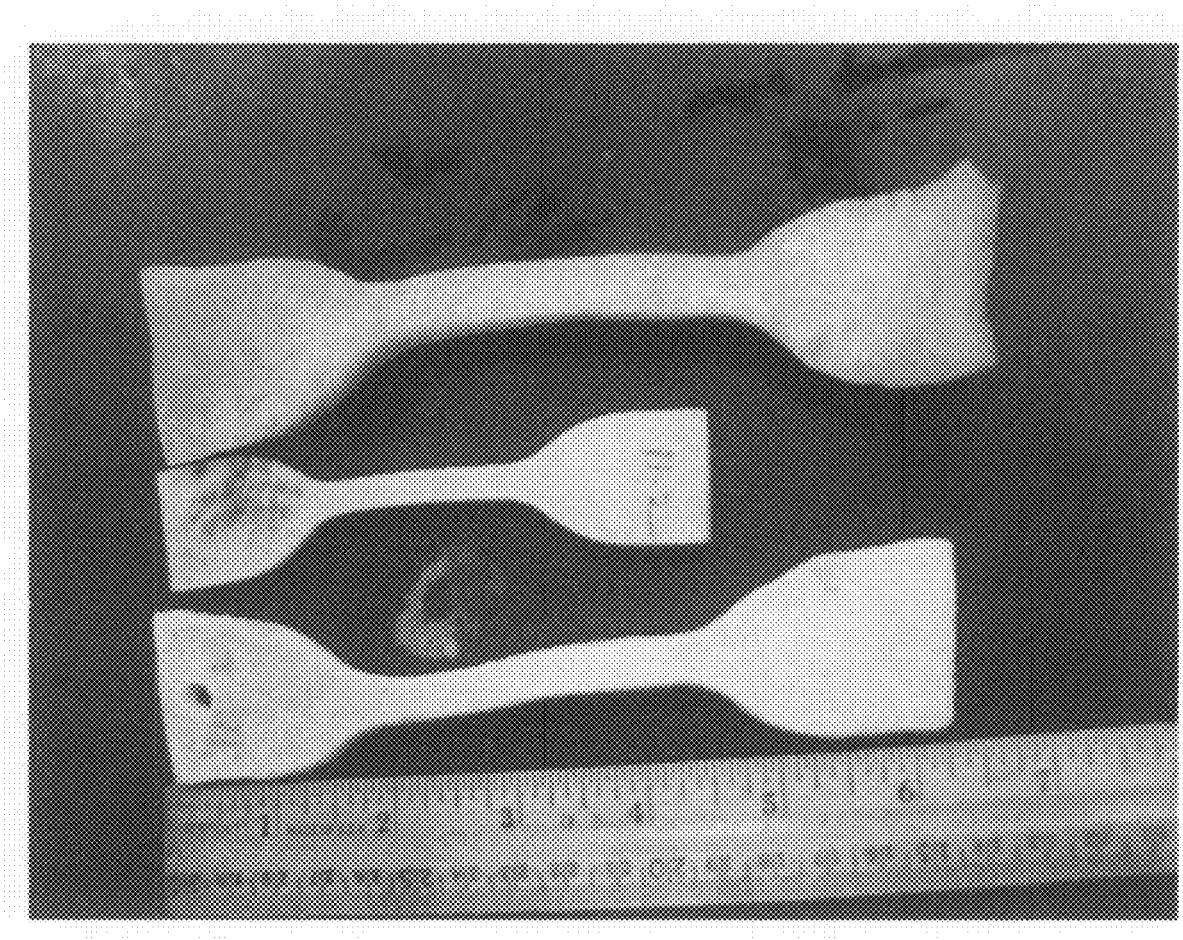
FIG. 12 is a photograph of swelling results of EPDM-MA elastomer useful in the invention after aging in kerosene and water, illustrating that EPDM-MA elastomers do not disintegrate when exposed to water under the test conditions used.

As stated earlier, one objective of the present invention was to develop elastomeric compositions that swell but do not disintegrate upon long term exposure to water and water based fluids, and methods of making such materials. FIG. 12 shows photographic comparison of an acid-grafted rubber consisting of sodium carbonate before exposure to any fluids; after exposure to Kerosene for 24 hours at room temperature; and after exposure to water at 100° C. for 24 hours. The rubber consisted of 30 phr of maleic acid, 30 phr of sodium carbonate and 1.5 phr of 40% dicumyl peroxide on an inert carrier. It is observed that the addition of soda ash significantly enhances the degree of swelling compared to the hydrogel-based rubber and acid-grafted rubber without soda ash. Swelling of 150 volume percent was observed for EPDM-MA elastomer after aging 24 hours at 100C in kerosene (top sample shown in FIG. 12), and a separate sample aged for 24 hours at 100C in water (bottom sample in FIG. 12) also exhibited 150 percent swell. The new EPDM-MA rubber did not disintegrate when exposed to water. It was observed that when 30 pbr of an alkali, such as sodium carbonate (soda ash) was added to compound consisting of 100 phr of EPDM, 30 phr of MA and 1.5 phr of 40% dicumyl peroxide, the rubber formed micro-porosities and partially or completely neutralized the acidic groups to form a salt. This apparently allowed the water to rapidly reach the interior region of molded part and increased the rate and extent of swelling.

As stated earlier, one objective of the present invention was to develop elastomeric compositions that swell but do not disintegrate upon long term exposure to water and water based fluids, and methods of making such materials. FIG. 12 shows photographic comparison of an acid-grafted rubber consisting of sodium carbonate before exposure to any fluids; after exposure to Kerosene for 24 hours at room temperature; and after exposure to water at 100° C. for 24 hours. The rubber consisted of 30 phr of maleic acid, 30 phr of sodium carbonate and 1.5 phr of 40% dicumyl peroxide on an inert carrier. It is observed that the addition of soda ash significantly enhances the degree of swelling compared to the hydrogel-based rubber and acid-grafted rubber without soda ash. Swelling of 150 volume percent was observed for EPDM-MA elastomer after aging 24 hours at 100C in kerosene (top sample shown in FIG. 12), and a separate sample aged for 24 hours at 100C in water (bottom sample in FIG. 12) also exhibited 150 percent swell. The new EPDM-MA rubber did not disintegrate when exposed to water. It was observed that when 30 phr of an alkali, such as sodium carbonate (soda ash) was added to compound consisting of 100 phr of EPDM, 30 phr of MA and 1.5 phr of 40% dicumyl peroxide, the rubber formed micro-porosities and partially or completely neutralized the acidic groups to form a salt. This apparently allowed the water to rapidly reach the interior region of molded part and increased the rate and extent of swelling.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. An oilfield apparatus comprising an elastomeric composition comprising the reaction product of a linear or branched polymer having residual ethylenic unsaturation with an ethylenically unsaturated organic monomer having at least one reactive moiety selected from the group consisting of acid, acid anhydride, and acid salt.

2. The apparatus of claim 1 wherein the linear or branched polymer having residual ethylenic unsaturation is selected from the group consisting of polymers of ethylene-propylenediene monomer (EPDM), natural rubber, cis-polybutadiene, trans-polyisoprene, ethylene-octene-based rubber, and copolymers and mixtures thereof.

3. The apparatus of claim 1 wherein the ethylenically unsaturated organic monomer having at least one reactive moiety comprises one or more non-conjugated dienes selected from the group consisting of dicyclopentadiene, 5-ethylidene-2-norbornene, and 5-methylene-2-norbomene 1,4-hexadiene.

4. The apparatus of claim 1 wherein the ethylenically unsaturated organic monomer having at least one reactive moiety selected from the group consisting of acid, acid anhydride, and acid salt comprises more than one ethylenically unsaturated moiety.

5. The apparatus of claim 1 wherein the ethylenically unsaturated organic monomer having at least one reactive moiety selected from the group consisting of acid, acid anhydride, and acid salts is selected from maleic acid, acrylic acid, methacrylic acid, oleic acid, linoleic acid, linolenic acid, palmitoleic acid, anhydrides thereof, salts thereof, and mixtures thereof.

6. The apparatus of claim 1 wherein the elastomeric composition comprises an inorganic swelling agent, selected from an alkali-carbonate, an alkaline earth carbonate, and mixtures thereof.

7. The apparatus of claim 1 wherein the elastomeric composition is vulcanized by an organic vulcanizing agent selected from the group consisting of organic peroxides, halogenated quinones, nitrobenzenes, and mixtures thereof.

8. The apparatus of claim 7 wherein the organic peroxide is selected from the group consisting of dicumyl peroxide, tert-butyl cumyl peroxide, di-tert-butyl-peroxide, dibenzoyl peroxide, di(tertbutylperoxyisopropyl)benzene, di(2,4-dichlorobenzoyl) peroxide, di(4-methylbenzoyl) peroxide, 2,5-dimethyl-2,5-di(tert-butylperoxy)hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, and tert-butyl peroxybenzoate.

9. The apparatus of claim 7 further comprising an inorganic vulcanization agent.

10. The apparatus of claim 8 wherein the linear or branched polymer having residual ethylenic unsaturation comprises from 1 to 100 percent of an oil-swell resistant polymer, with the balance comprising a water-swellable polymer.

11. The apparatus of claim 1 wherein the ethylenically unsaturated organic monomer having at least one reactive moiety selected from the group consisting of acid, acid anhydride, and acid salt comprises an acidic unsaturated monomer, the acidic unsaturated monomer copolymerized with or added to the elastomer, resulting in an elastomer that swells in low pH fluids.

12. The apparatus of claim 11 wherein the acidic unsaturated monomers is selected from the group consisting of 2-acrylamido-2-methylpropane sulfonic acid, 2-allyloxy-2-hydroxy-1-propane sulfonic acid, and vinylsulfonic acid.

13. The apparatus of claim 11 comprising an inorganic swelling agent.

14. The apparatus of claim 1 wherein elastomer comprises a polymer of zwitterionic monomers or a copolymer of zwitterionic monomers and unsaturated monomers blended into the elastomeric composition, allowing production of a crosslinkable elastomer that swells in high salinity brines as well as in hydrocarbon oil-based fluids.

15. The apparatus of claim 14 wherein the zwitterionic monomer is selected from the group consisting of:

N,N-dimethyl-N-acryloyloxyethyl-N-(3-sulfopropyl)-ammonium betaine,

N,N-dimethyl-N-acrylamidopropyl-N-(2-carboxymethyl)-ammonium betaine,

N,N-diinethyl-N-acrylamidopropyl-N-(3-sulfopropyl)-ammonium betaine,

N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate,
2-(acryloyloxyethyl)-2'-(trimethylammonium)ethyl phosphate,
[(2-acryloylethyl)dimethylammonio]methyl phosphonic acid,
2-methaeryloyloxyethyl phosphorylcholine (MPC),
2-[(3-acrylamidopropyl)diimethylanimonio]ethyl 2'-isopropyl phosphate,
1-vinyl3-(3-sulfopropyl)imidazolium hydroxide,
(2-acryloxyethyl) carboxymethyl methylsulfonium chloride,
1-(3-sulfopropyl)-2-vinylpyridinium betaine,
N-(4-sulfobutyl)-N-methyl-N,N-diallylamine ammonium betaine (MDABS), and
N,N-diallyl-N-methyl-N-(2-sulfoethyl) ammonium betaine.

16. The apparatus of claim 14 wherein the polymer of zwitterionic monomers comprises a copolymer of 2-methacryloyloxyethyl-2'-trimethylammonium ethyl phosphate inner salt (MPC) with one or more hydrophobic comonomers selected from the group consisting of $C_{4-18}$-alkyl methacrylates and fluoroalkyl methacrylates.

17. The apparatus of claim 1 wherein the oilfield element is selected from the group consisting of submersible pump motor protector bags, packer elements, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

18. An oilfield apparatus comprising a high temperature swellable elastomeric composition comprising a physical mixture or blend of a linear or branched polymer having residual ethylenic unsaturation with an acidic unsaturated monomer, wherein a first portion of the acidic unsaturated monomer is grafted onto the linear or branched polymer having residual ethylenic unsaturation, while a second portion remains in physical mixture with the elastomer, forming a high temperature resistant swellable elastomer.

19. An oilfield assembly for exploring for, drilling for, testing for, or producing hydrocarbons comprising:
(a) one or more oilfield apparatus selected from the group consisting of tubing, jointed pipe, sucker rods, electric submersible pumps, submersible pump motor protector bags, packers, packer elements, blow out preventers, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof; and
(b) one or more of the oilfield apparatus comprising an elastomeric composition comprising the reaction product of a linear or branched polymer having residual ethylenic unsaturation with an ethylenically unsaturated organic monomer having at least one reactive moiety selected from the group consisting of acid, acid anhydride, and acid salt.

20. A method comprising:
(a) selecting one or more oilfield apparatus having a component comprising an elastomeric composition comprising the reaction product of a linear or branched polymer having residual ethylenic unsaturation with an ethylenically unsaturated organic monomer having at least one reactive moiety selected from the group consisting of acid, acid anhydride, and acid salt ; and
(b) using the one or more oilfield apparatus in an oilfield operation, thus exposing the oilfield apparatus to an oilfield environment.

21. The method of claim 20 wherein the oilfield apparatus is selected from the group consisting of submersible pump motor protector bags, packer elements, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

22. The method of claim 20 wherein the oilfield apparatus is a zonal isolation tool.

* * * * *